US008792628B2

(12) United States Patent
Rondeau et al.

(10) Patent No.: US 8,792,628 B2
(45) Date of Patent: *Jul. 29, 2014

(54) SYSTEM AND METHOD FOR ENHANCED DO-NOT-DISTURB

(71) Applicant: CenturyLink Intellectual Property LLC, Denver, CO (US)

(72) Inventors: David E. Rondeau, Olathe, KS (US); Jill B. Brunton, Overland Park, KS (US); Victoria M. Toner, Sheboygan, WI (US); Jenny Lou Fisher, Winter Springs, FL (US); Randall Robert Blair, Lenexa, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/674,484

(22) Filed: Nov. 12, 2012

(65) Prior Publication Data

US 2013/0072165 A1 Mar. 21, 2013

Related U.S. Application Data

(63) Continuation of application No. 11/809,440, filed on May 31, 2007, now Pat. No. 8,340,263.

(51) Int. Cl.
*H04M 3/42* (2006.01)

(52) U.S. Cl.
USPC .................................. 379/201.01; 379/207.1

(58) Field of Classification Search
USPC ............... 379/211.02, 210.02, 207.1, 201.01
See application file for complete search history.

(56) References Cited

U.S. PATENT DOCUMENTS

| | | | |
|---|---|---|---|
| 2004/0235461 A1 | 11/2004 | Jackson et al. | |
| 2005/0020249 A1* | 1/2005 | Seo | 455/414.1 |
| 2005/0117730 A1* | 6/2005 | Mullis et al. | 379/210.02 |
| 2006/0020993 A1 | 1/2006 | Hannum et al. | |
| 2006/0105800 A1 | 5/2006 | Lee | |
| 2006/0234711 A1* | 10/2006 | McArdle | 455/445 |
| 2007/0060137 A1 | 3/2007 | Yeatts et al. | |
| 2008/0013540 A1* | 1/2008 | Gast | 370/392 |

* cited by examiner

*Primary Examiner* — Amal Zenati
(74) *Attorney, Agent, or Firm* — Swanson & Bratschun, L.L.C.

(57) ABSTRACT

A system and method for incremental do-not-disturb. User input is received to activate the incremental do-not-disturb on a telephone. The incremental do-not-disturb is activated for a time period in response to receiving the user input to activate the incremental do-not-disturb. Incoming calls are diverted during the time period in response to activating the incremental do-not-disturb.

18 Claims, 12 Drawing Sheets

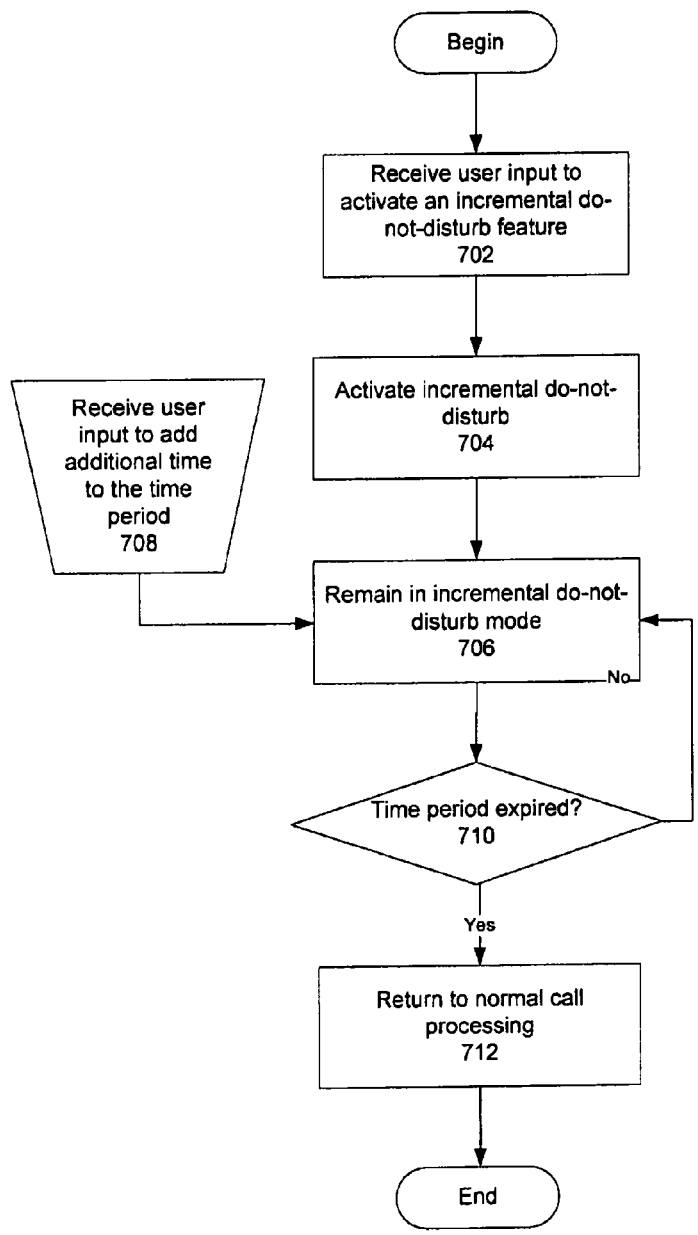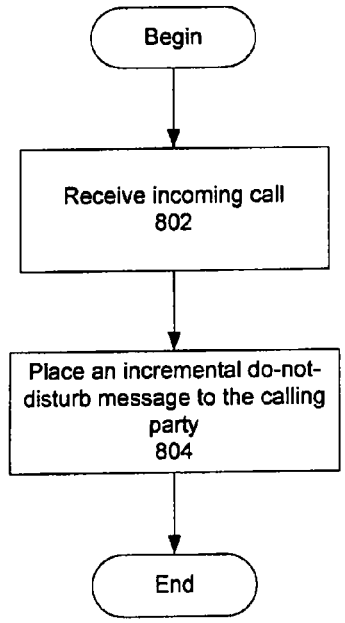

SYSTEM AND METHOD FOR ENHANCED DO-NOT-DISTURB

CROSS-REFERENCE TO RELATED APPLICATIONS

This application is a Continuation of U.S. patent application Ser. No. 11/809,440 filed on May 31, 2007 entitled SYSTEM AND METHOD FOR INCREMENTAL DO-NOT-DISBURB, the entire teachings of which are incorporated herein by reference.

BACKGROUND

The use of and development of communications has grown nearly exponentially in recent years. The growth is fueled by larger networks with more reliable protocols and better communications hardware available to service providers and consumers. Users have similarly grown to expect better communications from home, work, and on the go. For example, users now expect faster connection speeds, increased bandwidth, better reliability, and greater availability from all types of communications networks. In many cases, the growth is driven by people looking to give up traditional communications schemes for the efficiency, effectiveness, and availability of new networks. The growth of instant messaging and text messaging are examples of communications methods that are simple and effective. Despite the growth in the communications field, the methods for sending voice messages, using do-not-disturb features and presenting caller identification are still quite limited to traditional methods, configurations, and setups.

One example of communications technology that has not adapted to new trends and technologies is voicemail. Voice messages are valuable because of the emphasis, emotion, voice identification, personality, and large amount of information that a user may easily and efficiently communicate in a message or recognize from a message. In many cases, leaving a voice message feels more personal and effective than a text message even if both methods properly convey the same message. Individuals that may not be comfortable typing a text message are often more comfortable sending and receiving voice messages. The process for leaving a regular voicemail or recording an audio clip to be sent to a user is typically time consuming and cumbersome. As a result, the use of voice messages has largely been supplanted by text messages.

Similarly, options for communications with a home telephone have not significantly improved with changing technology. Most communications with family members at home are limited to legacy systems, such as answering machines and speaker phones. Many individuals would warmly embrace technologies and features that enhance communication with family members, make business easier, and provide additional security and peace of mind. There is a need for enhanced features for Voice over Internet Protocol (VoIP), standard telephones, wireless data and voice networks, and other communications devices, mediums, and networks.

SUMMARY

To prevent a user from receiving calls or other communication, a system and method for an enhanced do-not-disturb. One embodiment provides a system and method for incremental do-not-disturb. User input may be received to activate the incremental do-not-disturb on a telephone. The incremental do-not-disturb may be activated for a time period in response to receiving the user input to activate the incremental do-not-disturb. Incoming calls may be diverted during the time period in response to activating the incremental do-not-disturb.

Another embodiment provides a server enabling incremental do-not-disturb. The server may include a processor for executing a set of instructions and a memory for storing the set of instructions. The set of instructions may be executed to receive user input to activate the incremental do-not-disturb for a telephone, activate the incremental do-not-disturb for a time period in response to receiving the user input to activate the do-not-disturb, and divert incoming calls to the telephone during the time period in response to activating the increment do-not-disturb.

Yet another embodiment provides a telephone implementing incremental do-not-disturb. The telephone may include a processor for executing a set of instructions and a memory for storing the set of instructions. The set of instructions may be executed to receive user input to activate the incremental do-not-disturb for the telephone, activate the incremental do-not-disturb for a time period in response to receiving the user input to activate the do-not-disturb, and divert incoming calls to the telephone during the time period in response to activating the increment do-not-disturb.

BRIEF DESCRIPTION OF THE DRAWINGS

Illustrative embodiments of the present invention are described in detail below with reference to the attached drawing figures, which are incorporated by reference herein and wherein:

FIG. 7 is a flowchart of a process for using an incremental do-not-disturb feature in accordance with an illustrative embodiment of the present invention;

FIG. 8 is a flowchart of a process for implementing an incremental do-not-disturb feature in accordance with an illustrative embodiment of the present invention;

DETAILED DESCRIPTION OF THE DRAWINGS

Figure 1:
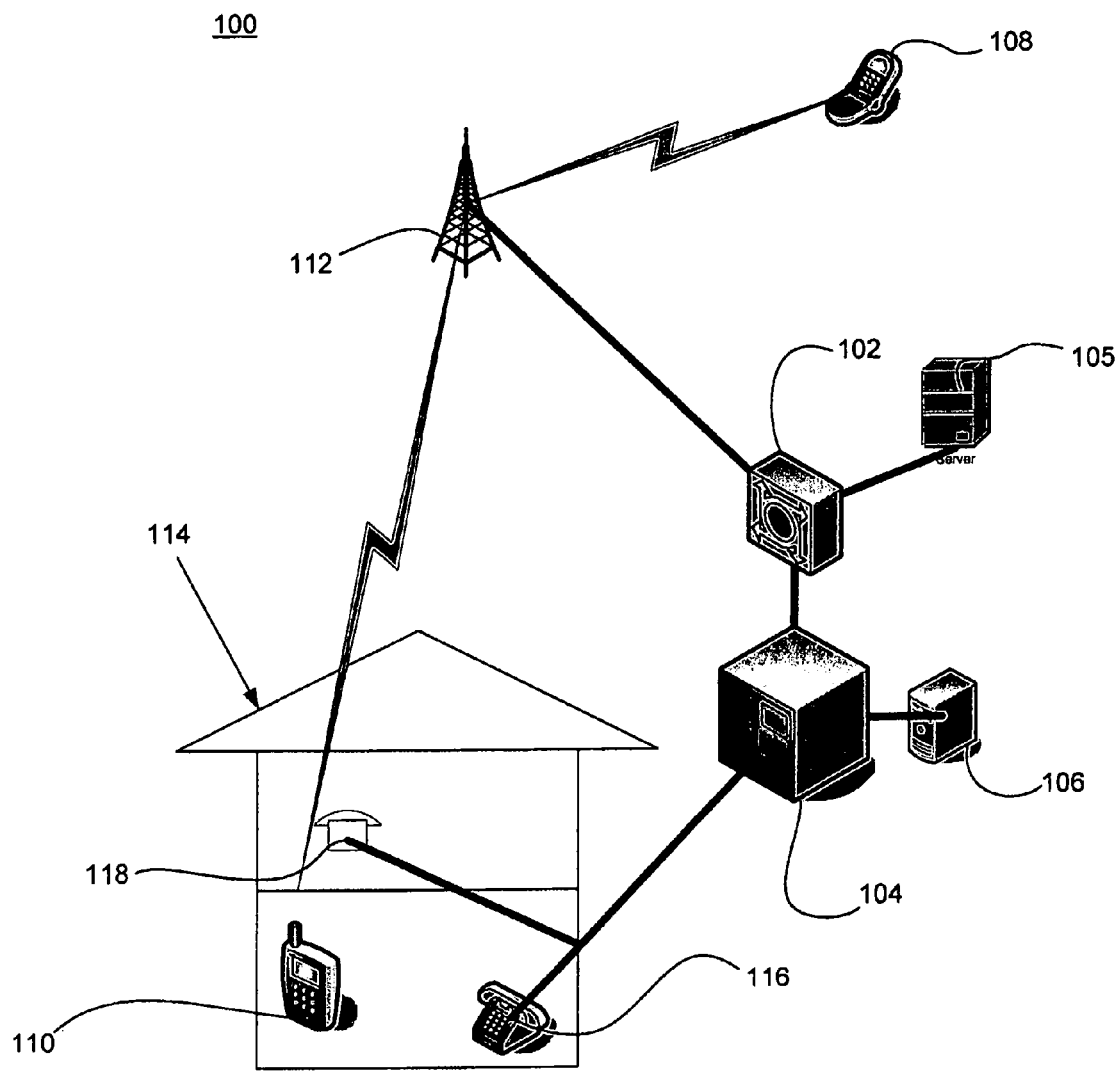
FIG. 1 is a perspective drawing of a communication system according to one embodiment of the present invention.

Illustrative embodiments of the present invention provide a system and method for implementing quick note messaging, intercom and monitoring communications, caller identification voice announcements, pre-call messaging, and incremental do-not-disturb features. The description, features, and services for each embodiment may also be applicable to all of the other embodiments. The embodiments may be implemented for telephonic devices which include plain old telephone service (POTS) telephones, VoIP telephones, wireless devices, and other communications devices, protocols and systems. The wireless device may be a cellular telephone, personal digital assistant, communications enabled MP3 player, or other similar wireless device.

The quick note messages, also referred to herein as quick notes, are short messages recorded for a telephonic device. When a calling party dials a user equipped with quick note messaging capability, the call is intercepted by the quick note messaging system. A prompt, such as a tone, may be played to the calling party indicating that the called wireless user or receiving party has a quick note messaging feature. However, the prompt may be a ring tone, message, tactile indicator, or textual indicator suitable to inform the calling party that a quick note message may be recorded for the receiving party without continuing the call or further communicating with the receiving party. Alternatively, the prompt may only be played to specified calling parties allowing them to leave quick note messages. The receiving party is the quick note messaging customer or wireless user being called.

If the calling party elects to leave a quick note message, a prompt is played to the calling party indicating that the system has began recording. In another embodiment, the different prompts may be integrated. At that point, the calling party may leave a message which is recorded by the quick note messaging system. In another embodiment, the prompt and tone are not played at all, but rather once the calling party has selected to leave a quick note message, the system automatically begins recording the message without prompting.

In one embodiment, the quick note messaging system may be an integrated portion of a voicemail system. Alternatively, the quick note messaging system may be a separate system that is part of the wireless communication network, such as an advanced intelligent networking feature. The quick note message is terminated once the calling party hangs up the telephone a time-out threshold is exceeded, when the user stops speaking for a specified time period, or based on a user selection. In one example, the time-out threshold may be ten seconds. Once the quick note message has terminated, the message is stored and the receiving party is notified that a quick note message is available by a message waiting indicator. The message waiting indicator may be an alert, flashed message or other textual, visual, or audio indicator alerting the receiving party that a message has been received. In one embodiment, the message waiting indicator may be the same indicator that is used for regular voicemail messages. Alternatively, the indicator for quick note messages may be a separate or different alert. For example, a message waiting indicator may display an envelope with a lightning bolt through it indicating a quick note message has been received.

In another embodiment, the quick note feature may only be used by calling parties that have been told that the user has quick note capability. For example, the user may enter a code or password, such as *2 before dialing a phone number that indicates that the calling party wants to leave the receiving party a quick note. At that point, a tone may or may not be used to inform the user that the system may immediately record a short message for the receiving party. The recording of the quick note may occur without presenting the user with a voice menu or other information. As a result, the entire process is extremely fast and efficient and quick notes may be quickly shared between sending and receiving parties. Quick notes may be particularly useful for wireless devices, but may also be sent from VoIP phones, standard phones, and other telephonic devices.

An illustrative embodiment for intercom and monitoring communication may allow a user to remotely monitor or carry on an intercom conversation with a telephonic device. The user may be required to present a pass code that authorizes the user to monitor or carry on a two-way conversation with the telephone remotely. As a result, the user may monitor the telephone for security purposes. Alternatively, the user may carry on an intercom conversation with a user that is unable to answer calls using traditional methods.

An illustrative embodiment for caller identification voice announce may be used to play a voice identifier associated with a calling party. The voice identifier may be a name, nickname or other user recording. The calling party may also be prompted to record the purpose or subject of the call so that the receiving party knows why the calling party is calling. The voice identifier may be associated with one or more caller identifiers associated with the calling party and the recorded purpose of the call. For example, a caller identifier may include a phone number, IP address, caller identification information, device identifier, account number, subscriber name, customer name, end-user name, or other information that is associated with the voice identifier. When an incoming call is identified as received from a specified calling party, the pre-recorded voice announce or voice identifier and recorded call purpose is played for allowing the user to identify the calling party. The user may identify a calling party without answering the phone, reading caller identification, or phone number associated with the calling party. As a result, the user may screen calls or know who and why to call back if near the telephone but unable to take the incoming call.

An illustrative embodiment for a pre-call message may be used to record a message for a future call from a calling party. A message may be recorded and designated for one or more calling parties. Once the calling party calls, the pre-call message is played to the calling party. The message may be designated or associated with a calling party using a phone number, IP address, caller identification information, device identifier, or other information. The user or receiving party may efficiently record a message for an anticipated call in the future or in case a calling party calls in the future.

In one embodiment, the next time the calling party calls the message may be played only once to the calling party. Once the entire quick note has been retrieved by the calling party, the quick note is deleted and subsequent calls are processed normally. Traditional voicemail may also be used in combination with the pre-call messaging. In other embodiments, the calling party may manage the pre-call or next time you call me messages. The pre-call message may be played to the calling party regardless of the status of the user or may be played based on user preferences regarding the status of the user. For example, if the user is on another call or has do-not-disturb set, the pre-call message may be played to the calling party.

An illustrative embodiment for incremental do-not-disturb may be used to provide a limited time period during which a telephonic device does not receive phone calls. The time period may be designated by a user in increments or as a specified time period. The time period may be reduced or ended at any time based on feedback and input from the user. Incremental do-not-disturb may be used to ensure that phone calls are not received for a specified time period, but that the telephone does not remain in that state for extended periods preventing the user from receiving important or expected phone calls.

FIG. 1 is a perspective drawing of a communication system according to one embodiment of the present invention. The communication system of FIG. 1 includes various elements used for wireless and wired communication. The communication system 100 includes a mobile switching center 102, a local exchange 104, voicemail systems 105 and 106, wireless devices 108 and 110, transmission tower 112, a home 114, and home telephones 116 and 118. In one embodiment, the different elements and components of the communication system 100 communicate using wireless communications or hardwired connections, such as fiber optics, cable, DSL, telephone lines and other similar hardwired connections.

The wireless devices 108 and 110 may communicate with the transmission tower 112 using communications protocols, such as time division multiple access (TDMA), code division multiple access (CDMA), global systems for mobile (GSM) communications, personal communications systems (PCS), WLAN, WiMAX, or other frequently used cellular and data communications protocols and standards. Communications within the communication system 100 may occur on any number of networks which may include wireless networks, data or packet networks, and publicly switched telephone networks (PSTN). The features of the present invention may be implemented by one or more elements of the communication system 100 independently or as a networked implementation.

In one embodiment, the mobile switching center 102, voicemail system 105, and transmission tower 112 are part of a wireless network that is operated by a wireless service provider. For example, the control signals and operational features may be performed by the mobile switching center 102 and the wireless signals may be broadcast from the transmission tower 112 to the wireless devices 108 and 110. The wireless network may include any number of systems, towers, and network and communications devices for implementing the features and performing the methods herein described.

The mobile switching center (MSC) 102 may be a switch used for wireless call control and processing. The MSC 102 may also serve as a point of access to the local exchange 104. The MSC 102 is a telephone exchange that provides circuit switched calling and mobility management and may also provide GSM or personal communications system (PCS) services to the wireless devices 108 and 110 located within the area the MSC 102 serves. The MSC 102 may include a home locator record (HLR) and virtual locator record (VLR) that may be used to implement different features of illustrative embodiments.

The voicemail system 105 may be an integrated part of the MSC 102 or alternatively may be an externally connected device. The voicemail system 105 may function to prompt a user to leave a quick note message or pre-call message as well as record the message, and alert and play the message to the intended recipient through signals sent between the voicemail system 105 and the wireless device 110. The mobile switching center 102 and voicemail system 105 may include any number of hardware and software components. In one embodiment, the MSC 102 is an advanced intelligence network device with software modules equipped to perform voicemail functions.

The local exchange 104 and MSC 102 communicate using a signal control protocol, such as a signaling system number 7 (SS7) protocol. The SS7 protocol is used in publicly switched networks to establish connections between switches, performing out-of-band signaling in support of the call-establishment, billing, routing, and information-exchange functions of the publicly switched network 134. The local exchange 104 may be owned and operated by a local exchange carrier that provides standard telephone service to any number of users. In one embodiment, the local exchange 104 may be a class 5 switch that is part of the network systems of the local carrier. The local exchange 104 may include or may be connected to the voicemail system 106. However, the local exchange 104 may also be a Digital Subscriber Line Access Multiplexer (DSLAM), Internet Protocol (IP) gateway, base station or any other suitable network access point.

The local exchange 104 may be a wire-line switch or public exchange using time domain multiplexing to provide telecommunications services to a particular subscriber or groups of subscribers. The local exchange 104 may be located at a local telephone company's central office, or at a business location serving as a private branch exchange. The local exchange 104 may provide dial-tone, calling features, and additional digital and data services to subscribers. The local exchange 104 may also enable VoIP communication of the home telephones 116 and 118 through a data network. VoIP works by sending voice information in digital form in packets, rather than in the traditional circuit-committed protocols of the publicly switched network.

The communication system 100 may further include any number of hardware and software elements that may not be shown in the example of FIG. 1. For example, in order to facilitate VoIP communications, the communication system may include application servers, media servers, service brokers, call agents, edge routers, gateways (signaling, trunking, access, sub, etc.), IP network service providers, exchanges, switches, users, and networks. The voicemail system 106 is similar to the voicemail system 105 except that it is equipped to handle voicemail for landline customers rather than wireless customers. The local exchange 104 or other components of a wire line network, such as a data, PSTN, VoIP, or other wired network may implement the features and perform the methods herein described.

The home 114 is an example of a dwelling or residence of a person or group that may use any number of communications services. The home 114 is shown as a residence in the illustrated example, however, the home 114 may also be an office, business, or other structure wired or otherwise suitably equipped to provide telephone service to one or more customers. In one embodiment, the home 114 is equipped with multiple telephonic devices, including home telephones 116 and 118. The home telephones 116 and 118 may be standard devices that provide dial tone and dialing, and voice conversation capabilities. Home telephone 116 may be integrated in any number of other devices or may be used in different forms. For example, the home telephone 116 may be part of a refrigerator. In another embodiment, the home telephone 118 may be integrated with a personal computer.

The communication services accessible from the home telephones 116 and 118 may include standard telephone service or VoIP telephone service. The home telephones 116 and 118 may be VoIP telephones or may be standard telephones that include a modem and/or VoIP adapters for enabling VoIP communications. A special dial tone, message, web alert, or other feedback may specify once or repeatedly that the home telephones 116 and 118 are implementing a particular feature. For example, the home telephones 116 and 118 may sound a double chirp when implementing the incremental do-not-disturb feature for incoming calls. The user may cancel use of any features by reentering the feature command or a cancellation command.

In an illustrative embodiment, the calling party and receiving party may use a wireless device, such as wireless device 108. Calls and other messages and data communications may be received from the home telephone 116 or from other wireless devices, such as wireless device 110. At any time, a user may select to enable, order, initiate, implement, or otherwise request the features herein described. The user may enable the feature in a number of ways. For example, the user may use a feature command that activates a function trigger. The feature command may be a signal generated to activate the function trigger for a device, such as the MSC 102, local exchange 104, voicemail systems 105 and 106 wireless device 110, or home telephones 116 and 118. In one example, the user may submit a feature command by dialing *79 on the home telephone 116. The feature command may also be a password, voice activated, time activated, preset by the user or any other suitable option, setting, command, or user input. In another embodiment, the various features may be implemented using tactile commands. For example, the user may tap the home telephone 118 four times in rapid succession to place the phone or service in a do-not-disturb mode for a twenty minute increment. Alternatively, a tactile pattern similar to Morse code may be used to tell the wireless device 110 to begin monitoring the home telephone 116 from the wireless device 110

Figure 2:
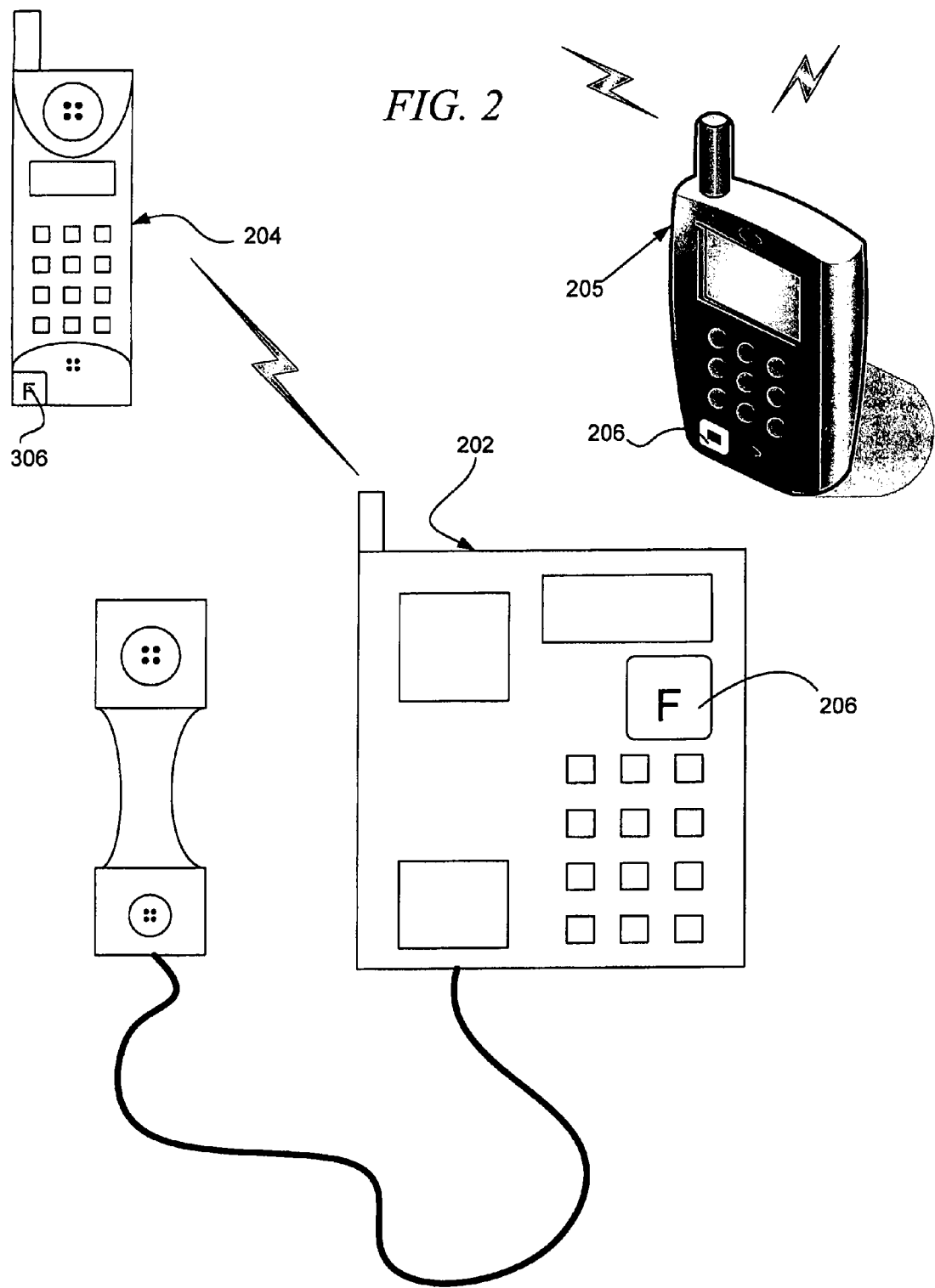
FIG. 2 is a block diagram of a voicemail system in accordance with the illustrative embodiments of the present invention.

FIG. 2 shows examples of communications devices in accordance with an embodiment of the present invention. FIG. 2 includes a telephone 202, a cordless telephone 204, and a wireless telephone 205. The telephone 202, cordless telephone 204, and wireless telephone 205 may include a feature button 206. The feature button 206 may be an interface that allows the user to send a signal or command to a class 5 switch, mobile switching center, or voicemail system or other component of the communication system 100 of FIG. 1 for activating a call feature from the standard telephone 202. Alternatively, the feature button may activate the individual device to perform the requested feature.

The feature button 206 may be a dedicated button, programmable or otherwise assignable graphical user interface, touch screen, microphone, scroll wheel, or other input device that generates the command signal that activates the feature for the telephone 202, cordless telephone 204, or wireless telephone 205. The telephone 202 and cordless telephone 204 are particular implementations of the standard telephones 116 and 118 of FIG. 1. The feature button 206 may be used to activate any of the methods, services, and features herein described.

The telephone 202 and cordless telephone 204 may be telephonic devices that operate in conjunction with a publicly switched network or class 5 switch. The telephone 202 may be a plain old telephone service (POTS) phone that functions using an analog connection. In another embodiment, the communication service accessible from the telephone 202 and the cordless telephone 204 may be part of VoIP telephone service or other data or packet network. The telephone 202 and cordless telephone 204 are provided dial tone connectivity through a wired connection for a home, business or other location in which the telephone 202 and cordless telephone 204 are located. The wireless telephone 205 may operate through a wireless network.

The wireless telephone 205, telephone 202, and cordless telephone 204 may include one or more accelerometers or electro sensitive sensors to receive user feedback in the form of a tactile response. For example, the user may tap the wireless telephone 205 to provide user feedback. For example, in order to further increment the time period of the incremental do-not-disturb feature of the wireless telephone 205 or cordless phone 204 the user may tap the phone twice. Alternatively, the user may activate the feature by tossing the wireless telephone 205 or cordless phone 204 onto a bed or couch. In another embodiment, different features may be activated or commands may be generated by touching specific portions of the telephonic device. For example, by touching and holding a corner of the wireless telephone 205, the wireless telephone 206 may begin recording a pre-call message.

Figure 3:
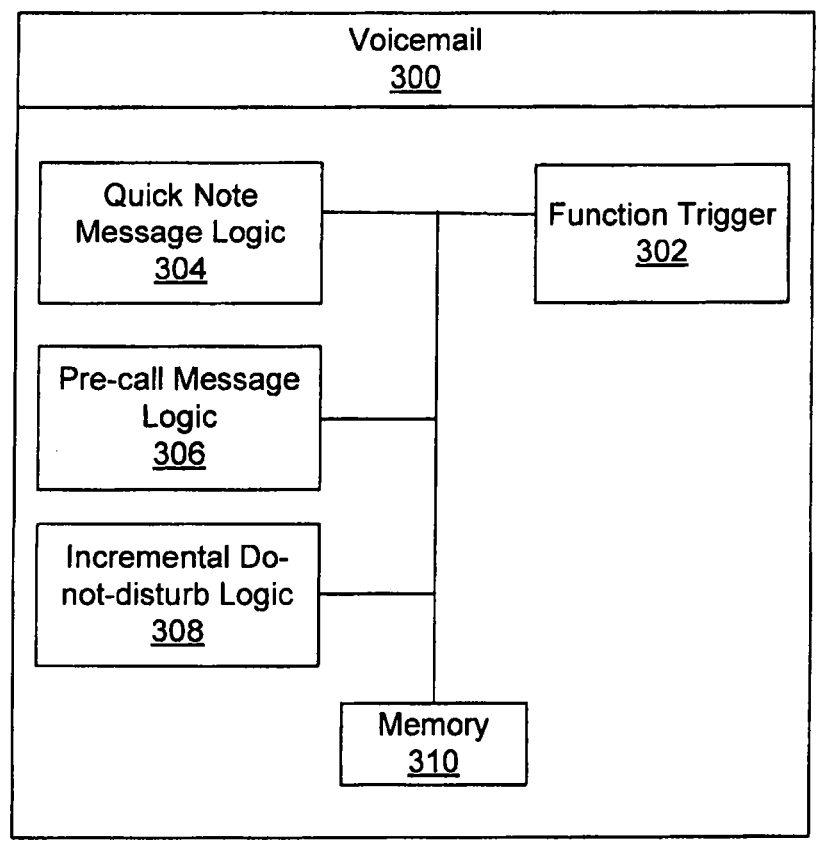
FIG. 3 is a block diagram of a home communication system in accordance with the illustrative embodiments of the present invention.

FIG. 3 is a block diagram of a voicemail system in accordance with an illustrative embodiment of the present invention. Voicemail system 300 is a particular implementation of voicemail systems 105 and 106 of FIG. 1. The voicemail system 300 may be one or more software modules and/or hardwired devices configured to perform the functions and features of quick note messaging, pre-call messaging, incremental do-not-disturb, or home monitoring and intercom communication as herein described. The voicemail system 300 may be part of a wireless network, a publicly switched network, an IP or other data network, or a home communication system.

For example, the voicemail system 300 may be a server, advanced network device, standard telephone, wireless telephone, or answering machine. In one example, the voicemail system 300 may be part of one or more servers or advanced intelligence network devices that functions as part of a wireless service provider's control system. In one embodiment, the voicemail system 300 includes a function trigger 302, quick note messaging logic 304, pre-call message logic 306, incremental do-not-disturb logic 308 and memory 310. The voicemail system 300 may further include elements, such as a processor, bus, hard drive, and other data processing elements and software.

The function trigger 302, quick note message logic 304, pre-call message logic 306, and incremental do-not-disturb logic 308 may be implemented individually, collectively in a single device or software component, to provide the features herein described. The user input that is used by the function trigger 302 to enable the features described may come from the telephone 202, cordless telephone 204, or wireless telephone 205 and particularly from the feature button 206 of FIG. 2.

In one embodiment, the function trigger 302 may be a software module triggered to notify a calling party that the receiving party has quick note messaging or play a pre-call messaging capability during a ring back period. The ring back period may be the time between the voicemail system 300 or other wireless or communication system receiving or intercepting an incoming call and the receiving device ringing. For example, the function trigger 302 may intercept an incoming call to the wireless device. The calling party is not required to sign up for quick note messaging or pre-call messaging in order to leave a quick note message or receive a pre-call message.

With regard to quick note messaging, in response to intercepting an incoming call, the function trigger 302 may play a quick note messaging prompt. The prompt may be a sound, tone, splash, recorded message, or other alert or visual indication, indicating that the calling party may leave a quick note message. The function trigger 302 and voicemail system 300 may allow multiple incoming calls to be processed and quick note messages to be recorded from different calling parties simultaneously. The quick note messaging prompt may be preceded with an interrupt tone to identify that the incoming call is being processed by the voicemail system 300 or wireless network. The interrupt tone may be used by fax machines and operator services to identify the nature of call processing. The function trigger 302 may only have a limited time period, such as three seconds, during the ring back period to receive user input from the calling party to leave a quick note message.

The quick note message logic 304 may store user preferences. In one example, only specified calling parties may be prompted to hear the messaging prompt. For example, the user may store phone numbers or other identifiers of persons that may send quick note messages through the voicemail system 300.

In one embodiment, the function trigger 302 may play a custom or default prerecorded message that may say "dial 1 to leave a quick note message". In another embodiment, the function trigger 302 may not sound or display a quick note messaging prompt to the user. As a result, only calling parties that have been told by the receiving party that quick note messaging is available know that they may leave a quick note message. The function trigger 302 allows a calling party to select to leave a quick note message before the call is completed to the wireless device or the call is passed to the receiving party's wireless device. As a result, the calling party may leave a quick note message during the ring back period before the wireless device rings and the receiving party answers.

Quick note messaging is efficient and easy to use. In some cases, the calling party will use quick note messaging in a manner similar to text messaging to leave quick and concise messages. In one embodiment, the quick note may be recorded and sent without the wireless device ringing and without presenting any prompts or messages to the calling party. As a result, once a quick note feature or message is selected by the calling party, the quick note message is saved for retrieval by the intended recipient. Alternatively, the calling party may simply want to leave a short message without the hassle or inconvenience of carrying on a full telephone conversation. For example, if the receiving party is in a meeting the calling party may elect to leave a quick note message so that the receiving party is not interrupted in the middle of the meeting. The function trigger 302 may receive user input or a user selection to leave a quick note message in any number of ways. In one embodiment, the user selection may be a key stroke or other signal indicating that the calling party desires to leave a quick note message. In another embodiment, the selection to leave a quick note message may also be made before the number of the receiving party is dialed.

In another embodiment, the wireless device of the calling party may be equipped with a specialized button, shortcut, dialing code, or function that when activated, sends a signal to the voicemail system 300 and the function trigger 302 indicating that the calling party wants to leave a quick note message. The user selection may also be voice activated. For example, after dialing the receiving party, the calling party may hear a message that says "say, Quick Note to leave a quick note message."

The quick note messaging logic 304 ensures that a message is properly recorded or stored, and that the receiving party is alerted that a quick note message is available. For example, the quick note messaging logic 304 may play a tone to prompt the calling party to record the quick note message once the calling party has provided user input indicating the desire to record a quick note message. This tone indicates that the voicemail system 300 is recording the message entered by the user. The quick note messaging logic 304 records the message left by the calling party in the memory 310.

In one embodiment, quick note messages and regular voicemail messages may be processed in the same manner. Quick note messages may be assigned to one inbox and voicemail messages may be assigned to another inbox. By their nature, quick note messages may be used to more quickly convey information that traditional voicemail messages. In another embodiment, quick note messages are process completely differently. Quick notes may be given preferential treatment over voicemail messages. For example, the voicemail system 300 may display that the number of quick notes received, time received, and calling party. The user may have only informed certain people of the availability and method for leaving a quick note message and as a result may have a greater interest in retrieving the quick note.

In one embodiment, the quick note messages may be downloaded or stored directly on the wireless device. For example, once received, the quick note message may be transferred from the voicemail system 300 to memory or storage on the wireless device with no copies remaining stored in the memory 310. As a result, the user may quickly listen to the quick note and process the quick note by replying, forwarding, deleting, or otherwise processing the quick note. A selected or custom alert may be used to indicate to the user that a quick note has been received by the voicemail system 300 or the wireless device. Alternatively, the quick note message logic 304 may use speech recognition or speech-to-text functionality to convert the quick note message to a text message or text for display to the user. The quick note message may be converted to text format by the voicemail system 300 or by the wireless device or telephone once downloaded. For example, a quick note message that has been converted to text may be displayed on a telephone or wireless device until dismissed.

The memory 310 may be any type of electronic storage media enabled for recording and storing a large number of quick note messages. The quick note messaging logic 304 stores the quick note message in the memory 310 as the message is recorded or after the call has terminated. The quick note messaging logic 304 may use a threshold to specify how long a quick note message may be. In one example, the quick note message may be thirty seconds long. The threshold may be set by default, by an administrator operating the voicemail system 300, or by the user.

The memory 310 or quick note messaging logic 304 may limit the number of quick note messages that may be recorded or stored. For example, the user may specify that if there are more than twenty messages that have not been listened to, the voicemail system 300 disables the feature so that no more quick note messages may be received by the receiving party to prevent the user from being overwhelmed or unable to catch up with the large number of messages. The voicemail system 300 may again enable the quick note messaging feature once a specified number of messages have been listened to or deleted. The receiving party may also specify deletion preferences for the memory 310. For example, messages that have been listened to may be automatically deleted after a week unless saved or otherwise designated for preservation.

Once the quick note message is stored in the memory 310, the quick note messaging logic 304 may activate a message waiting indicator. The receiving party may retrieve the quick note message from memory 310 in any number of ways. In one example, the quick note message may be played by pressing a single button, key code, or selecting a menu entry. The quick note messages may also be retrieved from a menu or queue integrated or separate from a text messaging application.

In one illustrative example, once the calling party dials the receiving party, the calling party will hear "Quick Notes" as the first ring back indication or messaging prompt. If the calling party enters "1" within three seconds a recording prompt alerts the calling party to leave a quick note message up to thirty seconds long. If the calling party does not enter "1" within three seconds, the normal ring back tones are played to the calling party and the receiving party's communication device rings.

The message waiting indicator may be an alert that indicates that a quick note message has been received. The message waiting indicator may be a signal that is sent to the wireless device that informs the receiving party that a quick note message is available. The message waiting indicator may be activated by toggling an icon, sounding an alert, vibrating, flashing or displaying a text message, or presenting a suitable audible visual or tactile indicator to the receiving party. The receiving party may have pre-established preferences for the quick note message prompt that is played to the calling party and the type and delivery of the message waiting indicator.

The receiving party may disable the quick note messaging service through the voicemail system 300 at any time. For example, the receiving party may select to disable the quick note messaging feature when out of town or on vacation so that any calling parties do not expect the receiving party to receive the quick note messages.

The quick note message logic 304 may be configured to not display message waiting indicators during off-hours. For example, the receiving party may select to block the message waiting alerts in the evening and throughout the night. A time of day do-not-disturb selection may be established during setup or at any time as desired by the quick note messaging customer. In one embodiment, the time of day do-not-disturb selection only affects whether the message waiting indicator is displayed to the receiving party. In another embodiment, the time of day do-not-disturb selection may be used by the quick note messaging logic 304 to disable the quick note messaging feature so that calling parties may not leave quick note messages during the specified times.

In one embodiment, the voicemail system 300 or quick note messaging system may be a stand-alone system accessible by one or more independent wireless carriers to provide quick note messaging for the customers of the wireless carriers. Incoming calls may be routed through the voicemail system 300 or simultaneously connected to the voicemail system 300 in order to provide the calling party the option of leaving a quick note message. The voicemail system 300 and call management system of other wireless carriers may communicate using any number of communications protocols, such as SS7 an international telecommunications protocol standard for transmitting digital data on a broadband network. As a result, the voicemail system 300 may be used to provide quick note messaging for a single wireless service provider or multiple wireless service providers.

The process described for the quick note message logic 304 as detailed herein may also apply for the pre-call message logic 306. Similarly, the voicemail system 300 may be used by a user to leave a message for a calling party. The user may provide user input to access the pre-call message feature. The user may elect to play a message preamble before the pre-call message by setting and otherwise configuring pre-call message preferences. The pre-call message logic 306 prompts the user to store a message to be played when a call is initiated by the intended recipient or calling party.

The pre-call message may be specified for one or more intended recipients. The intended recipients may be selected using caller identification information, voice identifier, phone number, IP address, or other information. The selected information for the calling party may be used by the pre-call message logic 306 to link the calling party with the pre-call message as recorded. The pre-call message and information regarding the intended recipients may be recorded and saved in the memory 310.

Once a pre-call message is recorded, other songs, tones, data, or messages referred to generically as "messages" set to play during the ring back period may be replaced by the pre-call message. The normal ring back message may be returned to normal playback once the intended recipients have heard or otherwise received the pre-call message.

In one embodiment, the pre-call message may only be played to the user only once or in a single session. The pre-call message logic 306 may ensure that the user is able to play the message at least once in its entirety. For example, if the call is disconnected, the quick note message remains stored in memory 310 until the entire message has been played to the user. The user may select to repeat the message during the single session, but once the voicemail system 300 has ensured that the message was successfully received, the message is automatically deleted from the memory 310. As a result, the retrieval process may be extremely simple and once the message is received by the calling party the message is deleted saving memory and other resources.

The function trigger 302 may activate the pre-call message logic 306 to play the message recorded in the memory 310 to the calling party in response to determining the incoming call originates from one of the intended recipients. The pre-call message logic 306 may interact with the calling party in order to replay, delete, save or listen to other stored pre-call messages. In one embodiment, the pre-call message logic 306 may output menu options, prompts, and a message preamble to the calling party in order to receive selections, commands and user input from the calling party. For example, the calling party may use button strokes, voice commands or other input when interacting with the pre-call message logic 306 and processing or managing the message. Once the calling party has listened to the message preamble and pre-call message, the pre-call message logic 306 may connect the calling party to voicemail or present other traditional options within the voicemail system 300.

In one example, a group supervisor may need to reschedule a meeting due to a personal emergency. The supervisor may leave a pre-call message that is designated for each member of the group collectively so that if any member of the group calls the supervisor, the voicemail system 300 plays a message preamble and the recorded pre-call message in the memory 310 that states, "A brief message has been recorded for you as follows: I have a personal emergency and our 4:00 p.m. meeting is rescheduled for tomorrow at the same time".

The incremental do-not-disturb logic 308 may also be enabled by the function trigger 300 based on user input. In one embodiment, the user may specify a time period during which the user does not want to receive calls. The time period may be manually specified or in increments. In one example, the user may select the feature button 206 of a VoIP phone, such as telephone 202 of FIG. 2 to enable incremental do-not-disturb. Each time the feature button is selected, the incremental do-not-disturb logic 308 may add five minutes to the time period. The time period associated with the feature button may be programmed. The feature button may specify time in seconds, minutes, or hours for activating the do-not-disturb feature.

In another example, the user may use buttons on a cellular telephone to enter "*45*". The function trigger 302 sends a message to the incremental do-not-disturb logic 308 that activates the incremental do-not-disturb feature for forty five minutes. The different methods of specifying the time period allows a user to easily select how long the phone is in the do-not-disturb mode before returning to normal functionality. This feature may provide the peace or interruption free time that a user may need to accomplish any number of tasks. The time period may also be decreased by the do-not-disturb logic 308 based on user input. For example, if a user decides that the do-not-disturb time period is too long, the time period may be decremented or reduced to zero so that incoming calls are processed normally.

In another embodiment, the user may specify an end time at which the do-not-disturb logic 308 ends the incremental do-not-disturb feature. Alternatively, the user may selectively specify a start time and end time for the time period. The specified start times and end times may be selected to reoccur based on the day of week or other events. The incremental do-not disturb logic 308 may also specify numbers that are specifically blocked or allowed during the time period. For example, calls from the chief executive officer of the user's company may be allowed at any time regardless of whether the incremental do-not-disturb feature has been activated. As a result, the user may specify calling parties that may call, text, email, or otherwise communicate with the user under any circumstances.

Figure 4:
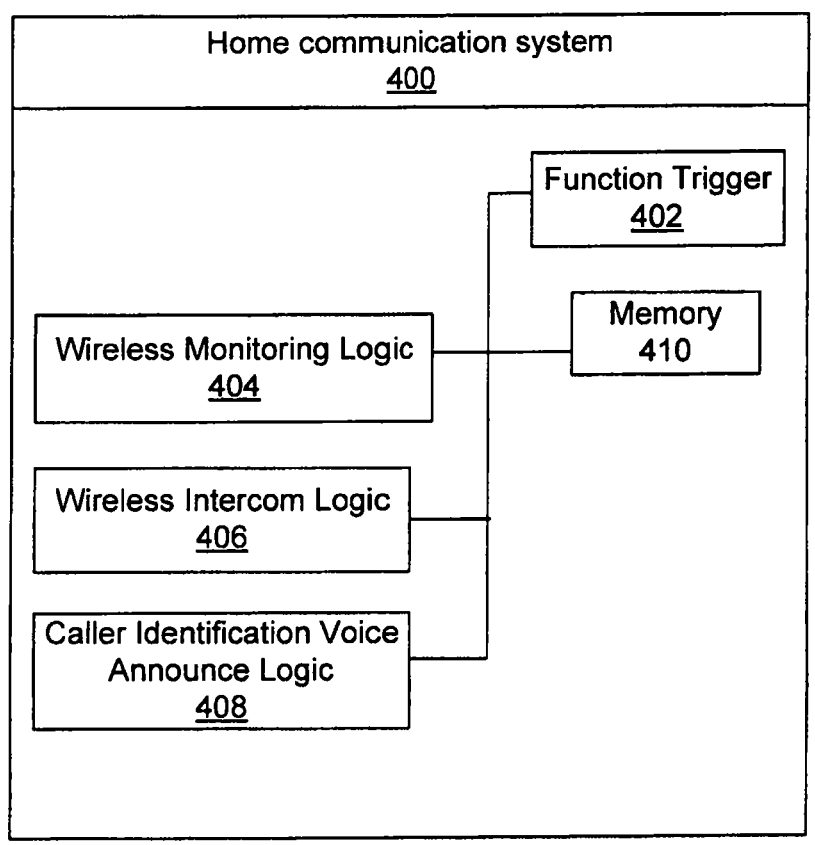
FIG. 4 is a flowchart of a process for implementing quick note messages in accordance with the illustrative embodiments of the present invention.

FIG. 4 is a block diagram of a home communication system in accordance with the illustrative embodiments of the present invention. Home communication system 400 is a hardwire element or software module within the mobile switching center 102 or local exchange 104 of FIG. 1. Alternatively, the home communication system 400 may be part of analog or VoIP telephone. The home communication system 400 may also be a server or other network device in communication with a communications network. The home communication system 400 may include a function trigger 402, wireless monitoring logic 404, wireless intercom logic 406, caller identification voice announce logic 408, and a memory 410. The home communication system 400 may also include the logic elements of voicemail system 300 of FIG. 3.

The function trigger 402 may be a module equipped to implement a monitoring or intercom feature. Initially when an incoming call is received, the function trigger 402 may play a prompt to the calling party. In one embodiment, this prompt may only be recognizable by the calling party as earlier established. Once the function trigger 402 has played the prompt or sent the prompt signal to the calling party, the function trigger 402 listens for a user selection. Once the function trigger receives the user selection, the function trigger prompts the calling party to enter a pass code. The pass code may be an identifier, password, authorization voice queue, or other authentication message that ensures that the calling party is authorized to activate wireless monitoring or intercom communication. Next the function trigger 402 determines whether the pass code is correct. If the pass code is correct, the function trigger 402 activates the wireless monitoring logic 404 or the wireless intercom logic 406 based on the previous user selection.

In one embodiment, the home communications system 400 may also include the memory 410 that allows a calling party to record the intercom conversation or monitored conversation. This may be particularly useful if there is a dramatic event occurring during the time the home communications system 400 is being used to monitor or perform home intercom communication with a telephone, such as standard telephones 116 and 118 of FIG. 1.

Wireless monitoring logic 404 may activate a telephonic device to monitor or listen for sounds in the room. For example, a couple out on a date may be able to easily determine whether the babysitter has their children in bed for the night or determine whether the babysitter is still acting responsibly based on the monitored noises and voice conversations.

The wireless intercom logic 406 may activate a home telephone or other home telephonic device to allow intercom communications. For example, if the calling party calls home to check on the family pets, once the appropriate user selection is received and the pass code is verified by the function trigger 402, the wireless monitoring logic 404 may activate or take the home telephone off-hook so that the calling party may ascertain whether the family pets are barking or whether the home environment seems quiet. Additionally, the calling party may speak to the dogs through the telephone to try and soothe them if agitated.

Additionally, the wireless intercom logic 406 may be used to communicate with children, family, or other individuals that are incapable of answering the home device. For example, a wheelchair bound person may be able to speak but may be unable to reach the home telephone. As a result, the wireless intercom logic 406 may activate the home telephone or a speaker function of the home telephone so that the calling party may communicate with the disabled person in the room without the disabled person being required to perform any tasks. The wireless monitoring logic 404 and wireless intercom logic 406 may be referred to as logic or an audio interface for implementing the monitoring and intercom communication described herein. In another embodiment, the home telephone may present no indication that the telephone is off-hook in the monitoring or intercom mode.

The wireless monitoring logic 404 and wireless intercom logic 406 may control other communications systems within the home. In one embodiment, the home telephone or home communication system 400 may be integrated with a specialized bed providing services to a disabled individual. The home communication system 400 may also communicate with a home security system or media system. For example, the speakers and microphones of the home security system may be used to monitor the home and perform intercom communication. The caller identification voice announce may be played in speakers inside or outside the house. Alternatively, the caller identification voice announce may be a tactile signal or pattern. For example, an article of clothing or furniture may be set to vibrate to a pre-designated signal when a specified person calls. This feature may be particularly useful for those of that are hard of hearing or otherwise disabled.

The caller identification voice announce logic 408 may perform various functions. The function trigger 402 may be used to activate the caller identification voice announce logic 408 to record and then play a caller identification voice announcement when an incoming call is received from a designated calling party. The caller identification voice announce logic 408 may also record a subject or purpose of a call as specified by calling parties.

The caller identification voice announce logic 408 responds to user input to link a calling party and a user-recorded caller identification voice announce. The calling party may be selected and then the user may be prompted by the caller identification voice announce logic 408 to record a caller identification voice announce. In another embodiment, the caller identification voice announce logic 408 may use speech-to-text to generate the caller identification voice announce. For example, caller identification information available with the incoming call signal may be used to automatically generate a caller identification voice announce for a party that does not have an associated caller identification voice announce, such as a person that has not called the user before.

The caller identification voice announce logic 408 may display or present an identifier associated with the calling party. For example, the caller identification voice announce logic 408 may present a list of individuals that have frequently called or been called by the user. The list may be presented graphically using a display of the telephone or other computing device in communication with the home communication system 400. Once the user has selected one or more calling parties, the caller identification voice announce logic 408 may prompt the user to record a caller identification voice announcement. The caller identification voice announcement is stored in the memory 410 and linked with the calling party selected by the user. The caller identification voice announce logic 408 may use a calling number, IP address, caller identification text, customer number, or other information to identify the calling party.

In one embodiment, the user may use a television or set-top box that is part of or linked to the home communication system 400 to link an identifier with the caller identification voice announce. For example, the user may specify a group of phone numbers including a home phone, cell phone, and work phone that are to be associated with a caller's picture and caller identification voice announce. As a result, when the caller calls from any of the specified devices, the identifier is used to display a picture and/or text associated with the calling party and play the caller identification voice announce to any number of multimedia devices.

The caller identification voice announce logic 408 may also use voice or speech recognition to link the calling party with the caller identification voice announce. As a result, the caller identification voice announce may be played for a calling party regardless of the phone, communication line, or location from which the calling party calls. The caller identification voice announce logic 408 may use historical data to perform commands or play the recorded caller identification voice announce. For example, when the calling party records or states the purpose of the call, the caller identification voice announce logic 408 may use speech recognition to identify the caller identification voice announce to be played. As a result, even if the calling party is calling from a phone or device without an identifier, the correct caller identification voice announce may still be played.

Once the function trigger 402 determines an incoming call is from the calling party, the caller identification voice announce plays the associated caller identification voice announce. In one embodiment, the caller identification voice announce may be programmed as a feature of an IP telephone. Alternatively, a separate device altogether may be connected to a communications line to provide the caller identification voice announce feature. In another embodiment, the user may be prompted to first record the caller identification voice announce and then one or more calling parties is associated using multiple caller identifiers to be associated with the caller identification voice announce. For example, a user may record, "Mother-in-law" and then the user may link the recorded caller identification voice announce with a home phone number, cellular phone number, and work number of the user's mother-in-law.

In another embodiment, the function trigger 402 or caller identification voice announce logic 408 may intercept an incoming call and prompt the calling party to specify a purpose of the call. The prompt may be pre-recorded by the user or a default message. For example, the prompt may state "Thank you for calling the Johnsons, please tell us why you are calling." The purpose of the call may be recorded for storage in the memory 410 for subsequent play back with the recorded caller identification voice announce. In one embodiment, the caller identification voice announce and then the recording of the subject or purpose of the call may be played from memory 410 to the user.

Figure 5:
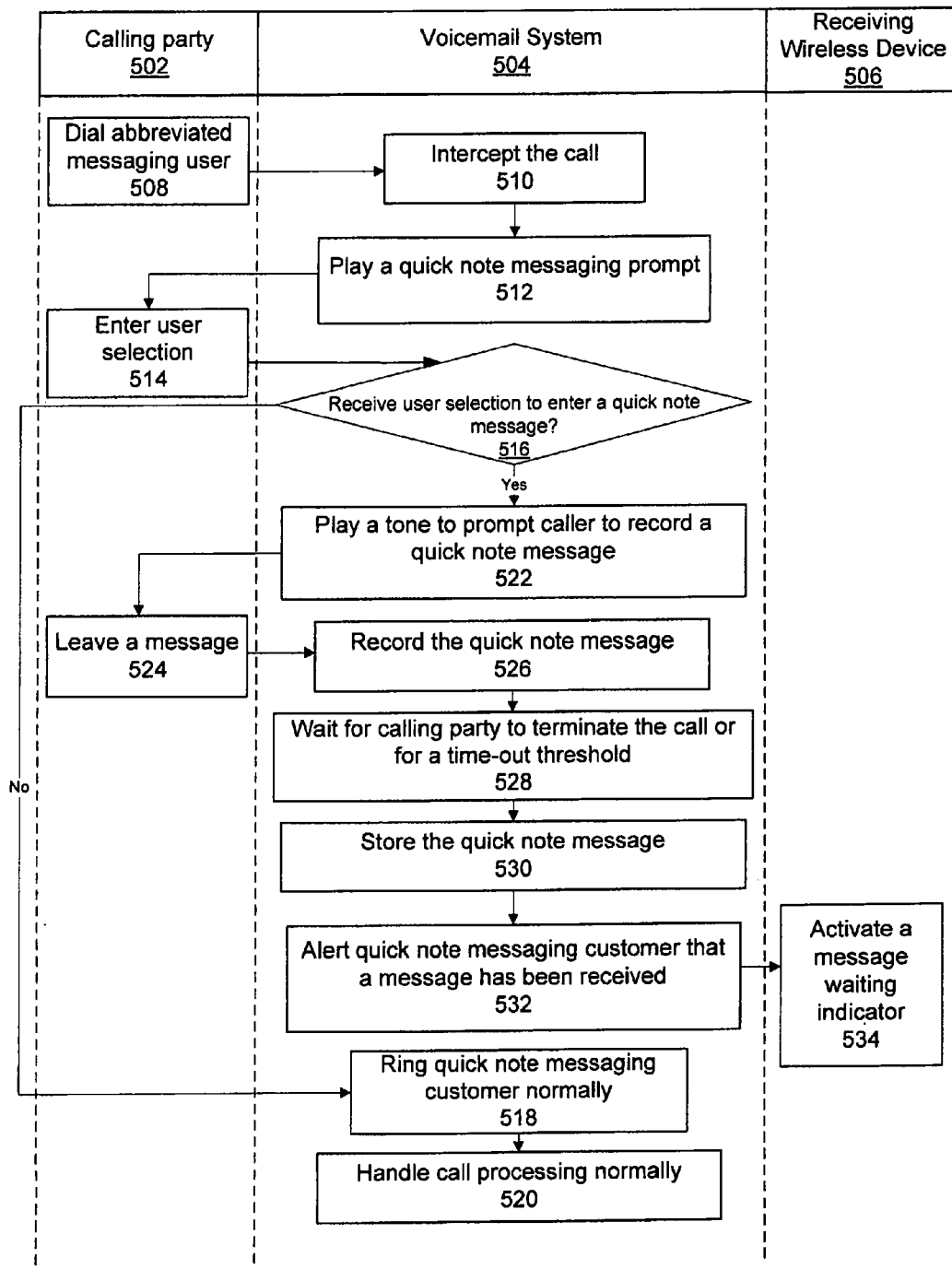
FIG. 5 is a flowchart of a process for home monitoring and using a home intercom in accordance with the illustrative embodiments of the present invention.

FIG. 5 is a flowchart of a process for implementing quick note messages in accordance with the illustrative embodiments of the present invention. FIG. 5 is a flow chart for various systems and devices, including a calling party 502, a voicemail system 504, and a receiving wireless device 506. The calling party 502 may be using a wireless device or wired telephone or other communications device. The process of FIG. 5 illustrates a process in which the user of the receiving wireless device 506 is a quick note messaging user.

The process begins with the calling party 502 dialing the receiving wireless device 506 (step 508). The quick note messaging user may have previously signed up for quick note messaging or quick note messaging may be part of a wireless service plan subscribed to. Next, the voicemail system 504 intercepts the call (step 510). The call may be intercepted or received by a function trigger or logic of the voicemail system 504. The voicemail system 504 plays a quick note message prompt (step 512). The quick note message prompt indicates that the receiving wireless device 506 is enabled for quick note messaging and that the calling party 502 may leave a quick note message if the user so selects. In another embodiment, no message prompt is played to the user.

The calling party 502 may provide a user selection (step 514). The user input or selection may be a voice command, button activation, or other input that indicates whether the user wants to leave a quick note message. Steps 510-514 may occur during a designated ring back period during which the calling party 502 may elect whether or not to leave a quick note message. Next, the voicemail system 504 determines whether the user input of step 514 indicates to enter a quick note message (step 516). If the user input in step 514 is no selection or is an incorrect selection, the voicemail system 504 rings the quick note messaging user normally (step 518). The voicemail system 504 then handles call processing normally (step 520). In steps 518 and 520 the voicemail system 504 may pass the dialed call to the mobile switching center or other wireless network devices for normal call processing.

In step 516, if the user selects to enter a quick note message the voicemail system 504 plays a tone to prompt the calling party to record a quick note message (step 522). Next the calling party 502 leaves a message (step 524). Simultaneously, the voicemail system 504 records the quick note message (step 526). The voicemail system 504 waits for the calling party to terminate the call or for a timeout threshold (step 528). The calling party 502 may terminate the message by hanging up the telephone, or alternatively, a timeout threshold may be specified by the voicemail system 504 to terminate the recording of the quick note message. In one example, the voicemail system 504 may be set to timeout after a recording period of forty-five seconds.

Next, the voicemail system 504 stores the quick note message (step 530). Once the quick note message is stored, the voicemail system 504 alerts the quick note messaging customer that a message has been received (step 532). In one example, the voicemail system 504 sends a signal to the receiving wireless device 506 that activates an icon, tone or vibrator of the receiving wireless device 506. The receiving wireless device 506 activates a message waiting indicator (step 534) with the process terminating thereafter.

An illustrative embodiment provides a system and method for quick note messaging. The quick note messages allow for a quick voice message that may be sent and received without complying with the emotional or social norms of a voice conversation. Quick note messaging may be a substitute to text messaging. The human voice may quickly and effectively communicate a message more effectively than a text message based on human abilities for speech and speech recognition.

Figure 6:
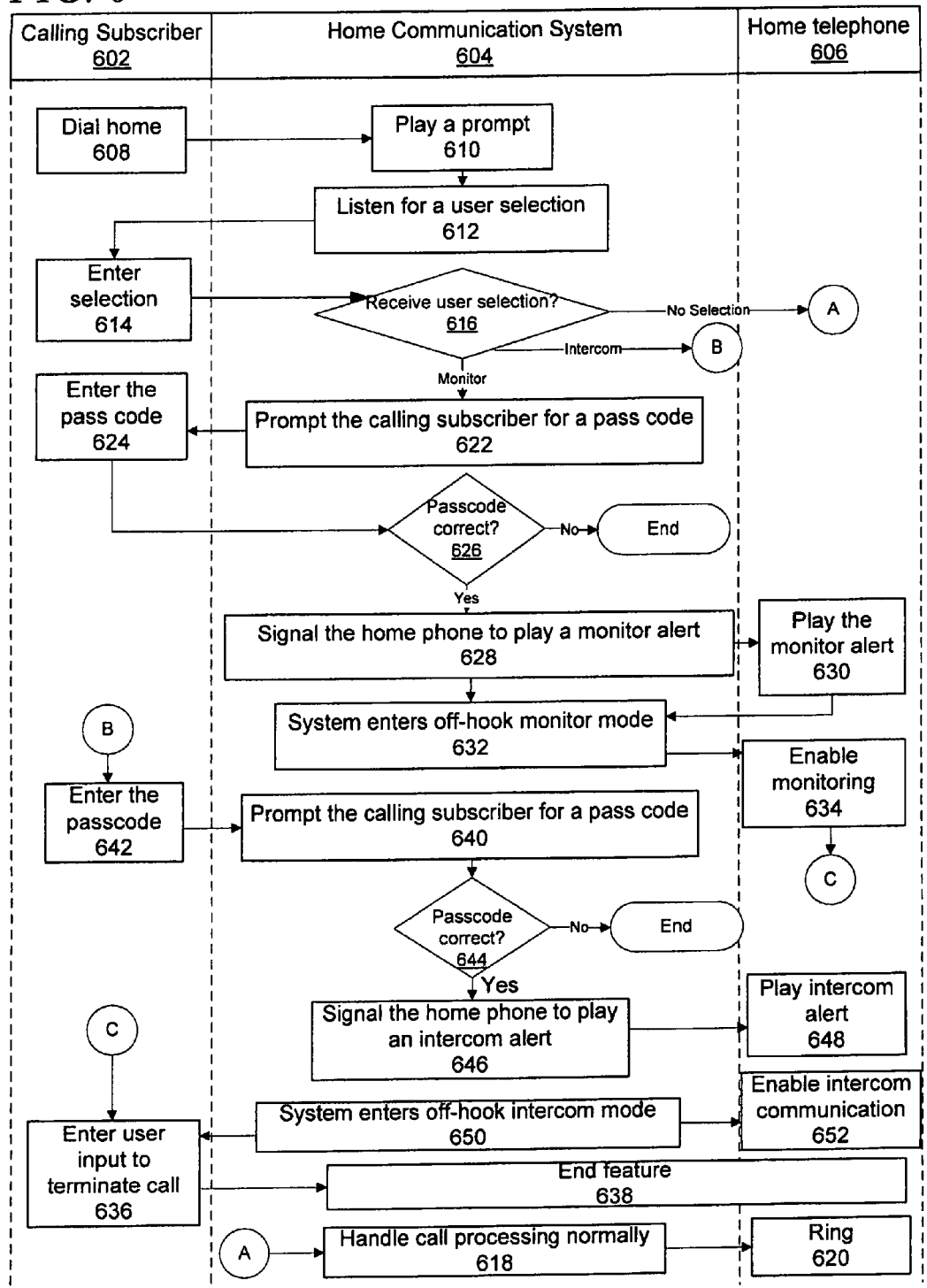
FIG. 6 is a flowchart of a process for home monitoring and using a home intercom in accordance with the illustrative embodiments of the present invention.

FIG. 6 is a flowchart of a process for home monitoring and using a home intercom in accordance with the illustrative embodiments of the present invention. The process of FIG. 6 describes a home monitoring and intercom system for a calling subscriber 602, a home communications system 604, and a home telephone 606.

The process begins with the calling subscriber 602 dialing home (step 608). The home communications system plays a prompt (step 610). The prompt may be an alert or indicator that informs the calling subscriber 602 that intercom and monitoring functionality are available. The prompt of step 610 may be played or activated during the ring back period for allowing the calling subscriber 602 to enter a selection.

Next, the home communications system 604 listens for a user selection (step 612). The calling subscriber 602 enters a selection (step 614). The user selection in step 614 may be to perform a monitor feature, an intercom feature, or may be no selection. The selection may be user input which may include pushing one or more buttons or speaking a command. The home communications system determines whether a user selection was received (step 616). If no selection or an incorrect selection is received, the home communications system 604 handles call processing normally (step 618). As a result, the home telephone 606 rings (step 620) with the process terminating thereafter.

If the home communications system 604 determines the user selection in step 616 is to perform a monitor feature, the home communications system 604 prompts the calling subscriber for a pass code (step 622). The calling subscriber enters the pass code (step 624). Next, the home communications system 604 determines whether the pass code is correct (step 626). If the pass code is not correct, the process terminates. The pass code ensures that unauthorized parties are not able to monitor the home to avoid privacy and security issues.

If the pass code is correct in step 626, the home communications system 604 signals the home telephone to play a monitor alert (step 628). Simultaneously, the home telephone 606 plays the monitor alert. (step 630). The monitor alert indicates to any individuals in the home that the home telephone is about to enter a monitor mode. Next, the home communications system enters an off-hook monitor mode (step 632) with the home telephone 606 enabling monitoring (step 634). Monitoring is terminated when the calling subscriber 602 enters user input to terminate the call (step 636).

If the user selection in step 616 is to perform intercom communication, the home communications system 604 prompts the calling subscriber for a pass code (step 640). Next, the calling subscriber 602 enters the pass code (step 642). The home communications system 604 determines whether the pass code is correct (step 644). If the pass code is not correct, the process terminates. If the pass code is correct in step 644, the home communications system 604 signals the home telephone to play an intercom alert (step 646) and the home telephone 606 plays the intercom alert (step 648).

Next, the home communications system 604 enters off-hook intercom mode (step 650) and the home telephone 606 enables intercom communication (step 622). The intercom feature remains active until the calling subscriber 602 enters user input to terminate the call (step 636) with the home communications system 604 and home telephone 606 ending the feature (step 638). The home communications system 604 and home telephone 606 then end the feature (step 638). In one embodiment, the home telephone 606 does not play a monitor alert or intercom alert or provide any indication that the home telephone 606 is off-hook. As a result, the monitor feature may be performed without notice.

The intercom feature described allows a user to quickly use intercom communication to communicate with individuals that are unable to answer the telephone in a traditional manner. For example, the intercom feature may be used to communicate with a babysitter that has been told to not answer the phone. Additionally, the intercom feature may be used to communicate with wheel chair bound individuals and to check on family pets to determine their status.

In another embodiment, the calling subscriber 602 may only need to dial a number and enter a code, identifier, password, or voice command during a ring back period to automatically enter a monitor or intercom mode with the home telephone 606. For example, the calling subscriber 602 may dial #2 and then dial the home telephone 606 phone to be monitored. In a simplified method of operation, no prompts or alerts may be displayed to the calling subscriber 602 or home telephone 606. Additionally, the home communication system 604 and home telephone 606 that is being used for intercom communication or monitoring may not present or play an indication that the home telephone 606 is operating differently. For example, no audio or visual distinctions, such as an off-hook signal or lights, in the phone may be presented indicating that the home telephone 606 is being monitored. The home telephone 606 may even use a hold or second line feature to allow a person with access to use the phone normally without an indication that the intercom or monitor feature is active. As a result, the user may monitor the phone and/or home without alerting anyone in the home that the monitor/intercom feature is being performed. The calling subscriber 602 may also mute the phone on the calling side so that breathing or other noises are not transmitted to the monitored device. In either case, the home communication system 604 which may be a server, phone, network device, or wireless element may be programmed so that the phone in the home telephone 606 does not ring. The home communication system 604 may control the speaker and microphone of the home telephone 606 so that the communication occurs as desired by the calling subscriber 602. The home telephone 606 may also communicate or be integrated with televisions, graphical displays, media systems, and home security systems for enhanced functionality.

FIG. 7 is a flowchart of a process for using an incremental do-not-disturb feature in accordance with an illustrative embodiment of the present invention. The process of FIG. 7 may be implemented by a server, HLR, class 5 switch, wireless device, VoIP telephone, standard telephone, or other advanced intelligence network device generally referred to as the "device".)

The process begins by receiving user input to activate an incremental do-not-disturb feature (step 702). The user input may be received in any number of ways. In one embodiment, the telephone includes a do-not-disturb button that may be pushed or activated. A user may also assert a code or provide other user input including tactile controls and voice commands that activate the do-not-disturb feature. For example, the user may press the number one, twice in rapid succession to provide user input for the device. The user input of FIG. 7 may also be received from an element or device in communication with the device, such as a computer or television.

Next, the device activates the incremental do-not-disturb feature (step 704). Once the incremental do-not-disturb feature is activated, the telephone may perform various tasks. In one embodiment, the telephone plays a message such as "The person you are calling is not accepting calls for another thirty minutes". After playing the message, the call may or may not be sent to voicemail based on user preferences. The amount of time specified in the message, such as thirty minutes, may relate to a time period remaining before the do-not-disturb function expires. The time period may be initially set based on the user input in step 702. For example, the user may press one, one, three, zero in succession to specify that the telephone is entering do-not-disturb mode for thirty minutes. The user may be able to specify a time period or may be limited to pre-programmed increments, such as 15, 30, 45, 60, or 75 minutes. The size of the increments may also be specified by the user based on individual needs. Because the user may specify a time period the user does not need to worry that he/she will accidentally leave the telephone in incremental do-not-disturb mode and miss important or expected telephone calls.

The device remains in incremental do-not-disturb mode (step 706). While the device is in incremental do-not-disturb mode, the phone call diverts all incoming calls. The diverting as herein used refers to preventing the phone from ringing, passing the incoming call directly to voicemail, or intercepting incoming calls to play a do-not-disturb message to the calling parties. The diverting may be performed by a phone, server, home locator record, or other wireless or network device. In one embodiment, a server may not forward the incoming call to a phone while in the incremental do-not-disturb mode in order to preserve resources, such as communication paths, circuits and available bandwidth. As the phone calls are diverted in step 706 the operation of the microphone, ringer, and speaker components of the telephone may be closely controlled. While the calls are diverted, the time period remaining may be translated or inserted into the incremental do-not-disturb message played to the user in a count down to the end of the time period. The incremental do-not-disturb feature is particularly useful because of the ability to increment or decrement the time period that the device is in the do-not-disturb mode. The feature also allows calling parties to easily ascertain when they may be able to call again to attempt communication with the user of the incremental do-not-disturb feature.

During step 706, the ringer continues to be inactive or deactivated. Incoming telephone calls may be diverted from normal call processing and two-way communication. At any time, the device may receive user input to add additional time to a time period (step 708). The time period may specify how long the telephone remains in incremental do-not-disturb mode before returning to normal call processing. The user input of step 708 may be similar to the user input received in (step 702). Alternatively, the user may press a single button or enter a code to increase the time period. For example, the user may press a feature button to increase the time period by two increments of ten minutes, or in other words, twenty minutes is added to the time period. In another embodiment, the user may decrease the time period in step 708 if the user wants to exit the incremental do-not-disturb mode earlier than originally selected based on changing circumstances, needs, and wants of the user. As a result, the incremental do-not-disturb feature may be easily ended at anytime or the time period may be decremented.

In another embodiment, the user may provide the user input in step 708 by tapping or throwing the device. The user may tap the device a single time or in a series or pattern of taps to provide specific user input. The user input may be received through one or more accelerometers that measure the position and motion of the device. For example, the user may tap the phone three times to add forty five minutes to the time period of the incremental do-not-disturb feature.

Next, the device determines whether the time period has expired (step 710). The time period may be established by a timer, counter, clock, or other time keeping element of the device. If the time period has not expired, the device remains in incremental do-not-disturb mode (step 710). If the time period has expired in step 710, the device returns to normal call processing (step 712) with the process terminating thereafter. During step 712, the device is re-enabled to allow incoming calls to ring through to the user to be answered or ignored. The incremental do-not-disturb feature prevents a user from leaving do-not-disturb active too long by using a time period that may be incremented, decremented or deleted at any time.

FIG. 8 is a flowchart of a process for implementing an incremental do-not-disturb feature in accordance with an illustrative embodiment of the present invention. The process of FIG. 8 may be implemented by a server, HLR, class 5 switch, wireless device, VoIP telephone, standard telephone, or other advanced intelligence network device generally referred to as the "device". The process begins by receiving an incoming call (step 802). Next, the device plays the incremental do-not-disturb message to a calling party (step 804) with the process terminating thereafter. The message played in step 804 may be played during a ring back period. As previously mentioned, the message may specify that the user is temporarily not accepting calls and may specify a time period before the incremental do-not-disturb feature expires and calls may be processed normally. After step 804, the calling party may be sent to the user's voicemail based on user preferences, service plan, or other configurations.

Figure 9:
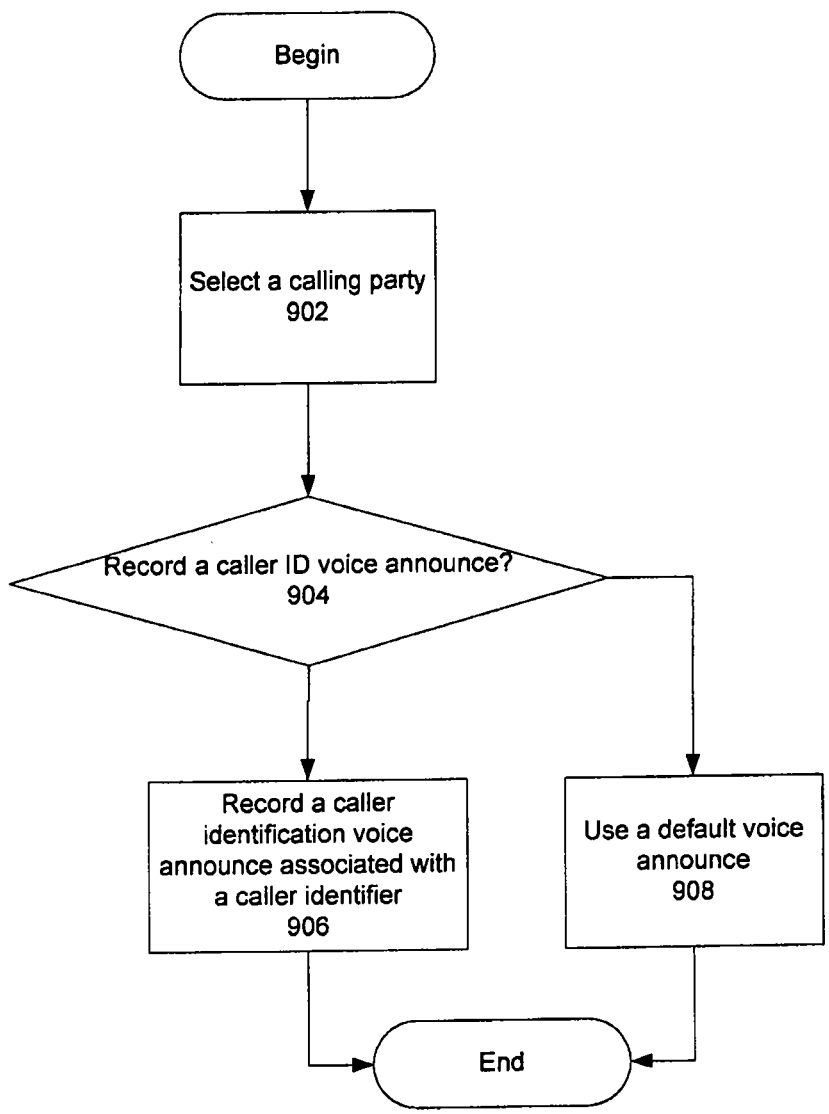
FIG. 9 is a flowchart of a process for establishing a caller identification voice announce in accordance with an illustrative embodiment of the present invention.

FIG. 9 is a flowchart of a process for establishing a caller identification voice announce in accordance with an illustrative embodiment of the present invention. The process of FIG. 9 may be implemented by a VoIP server, VoIP telephone, or other digital device used for VoIP or digital communication. The process begins by selecting a calling party (step 902). The calling party may be selected based on user input. The user input may include a telephone number, caller identification text, IP address or other identifier or information that identifies the calling party.

Next, the device determines whether to record a caller identification voice announce (step 904). The determination of step 904 may be made based on user input. For example, the user may press a button, enter a code, or otherwise generate a signal or provide input used to make the determination. The caller identification voice announce may be a verbal recording by a user associated with the calling party.

If the device determines to record the caller identification voice announce, the device records a caller identification voice announce associated with a caller identifier (step 906). For example, the user may associate a home phone number of the user's mother with a written recording of the user speaking, "mom's calling". As a result, whenever the user's mother calls from that telephone number the caller identification voice announce "mom's calling" is played through the VoIP telephone or through an audio system in communication with the VoIP telephone. The caller identification voice announce may be associated with one or more caller identifications for each user. For example, the IP address of the user's mothers home VoIP phone, a phone number of the wireless device of the user's mother, and a text identification of the a work number used by the user's mother may be associated as caller identifiers with the caller identification voice announce. A picture or text may also be associated with the caller identifier so that the caller identification voice announce, picture, and associated text may be displayed on any number of devices in communication with the telephone.

If the device determines not to record a caller identification voice announce in step 904, the device may use a default voice announce (step 908). The default voice announce may be an automated program for speaking the text associated with a caller identification, the associated telephone number, IP address, or other information of the calling party.

Figure 10A:
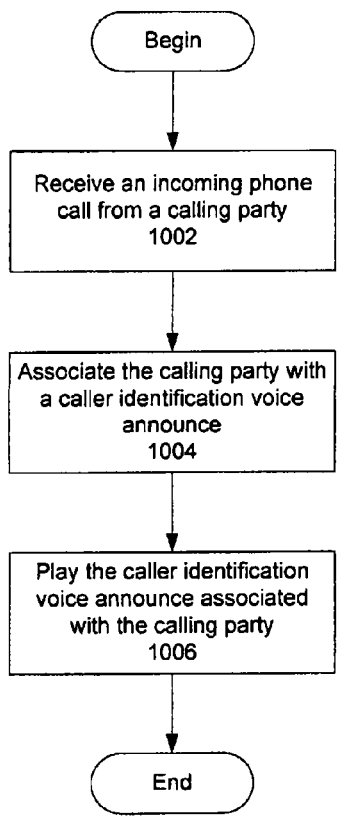
FIG. 10A-B are flowcharts of processes for playing a calling identification voice announce in accordance with an illustrative embodiment of the present invention.

FIG. 10A is a flowchart of a process for playing a calling identification voice announce in accordance with an illustrative embodiment of the present invention. The process of FIG. 10A-B may be implemented by a server, HLR, class 5 switch, wireless device, VoIP telephone, standard telephone, or other advanced intelligence network device generally referred to as the "device". The process of FIG. 10A begins by receiving an incoming telephone call from a calling party (step 1002). Next, the device associates the calling party with a caller identification voice announce (step 1004). Caller identification voice announce logic within the device or module of the applicable system may be used to perform the association of step 1004. The calling party may be associated with a recorded caller identification voice announce in any number of ways. In one embodiment, a caller identifier including a telephone number, Internet protocol address, voice recognition, or caller identification name may be used to link the calling party with the recorded caller identification voice announce. The caller identification voice announcements and associated caller identifier recorded in step 906 of FIG. 9 may be stored in a table, directory, database, or other organization information storage element or program in order to perform step 1004. The caller identifier may be translated from the table to associate the calling party with the caller identification voice announce.

Next, the device plays the caller identification voice announce associated with the calling party (step 1006). For example, if the user's mother calls from a number linked with the calling party the pre-recorded caller identification voice announce is played through the Internet protocol telephone or through a link audio device. As a result, even if the user is not close enough to a telephone to read the caller identification, the audio identification alerts the user as to the calling party. This feature allows the user more flexibility in determining whether or not to answer the phone and whether the user should go to the location of the telephone to take the call. The user may record a spoken nickname, sound, or other audio indicator the user prefers to associate with the calling party. The device may play the voice announce through a speaker or separate interconnected system, such as a home intercom system or a media system.

In one embodiment, the caller identification voice announce may be a recording of the user speaking the phone number and message, such as "Call coming from 998-998-9989". The phone may be connected to a television, computer, or media system. The television may play the voice announcement for a user that is watching or near the television. In another embodiment, the caller identification voice announce may include a picture or text that is displayed on the device once the incoming call is received from the calling party.

Figure 10B:
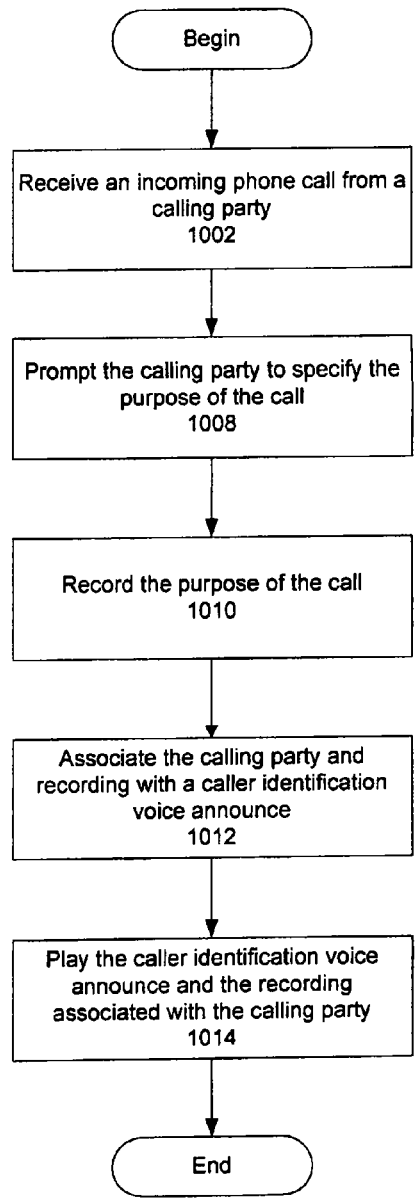

FIG. 10B is a flowchart of a process for playing a calling identification voice announce in accordance with an illustrative embodiment of the present invention. The process begins by receiving an incoming phone call from a calling party (step 1002). The device prompts the calling party to specify the purpose of the call (step 1008). The incoming call may be intercepted by a server or other auto attendant device, feature of a network device or the phone. In one example, the device may state "Thanks for calling the Smiths, please state the purpose of your call within the next five seconds." The purpose of the call may include the subject, name or identity of the person calling, reason for calling, or portion of the message or conversation the calling party would like to convey to the user.

Next, the device records the purpose of the call (step 1010). The purpose of the call may record the calling party as long as he or she talks after the prompt. Alternatively, the device may perform the recording for a time period, such as three to ten seconds. The device associates the calling party and the recording with a caller identification voice announce (step 1012).

Next, the device plays the caller identification voice announce and the recording associated with the calling party (step 1014). For example, the caller identification voice announce may state "Grandma" as the pre-defined caller followed by the recording of Grandma saying, "Are we still on to go to the monster truck rally on Saturday?" as the purpose of the call. In one embodiment, if the recording was not associated with the calling party in step 1012 because of lack of information or other association problems, only the recording may be played in step 1014.

Figure 11:
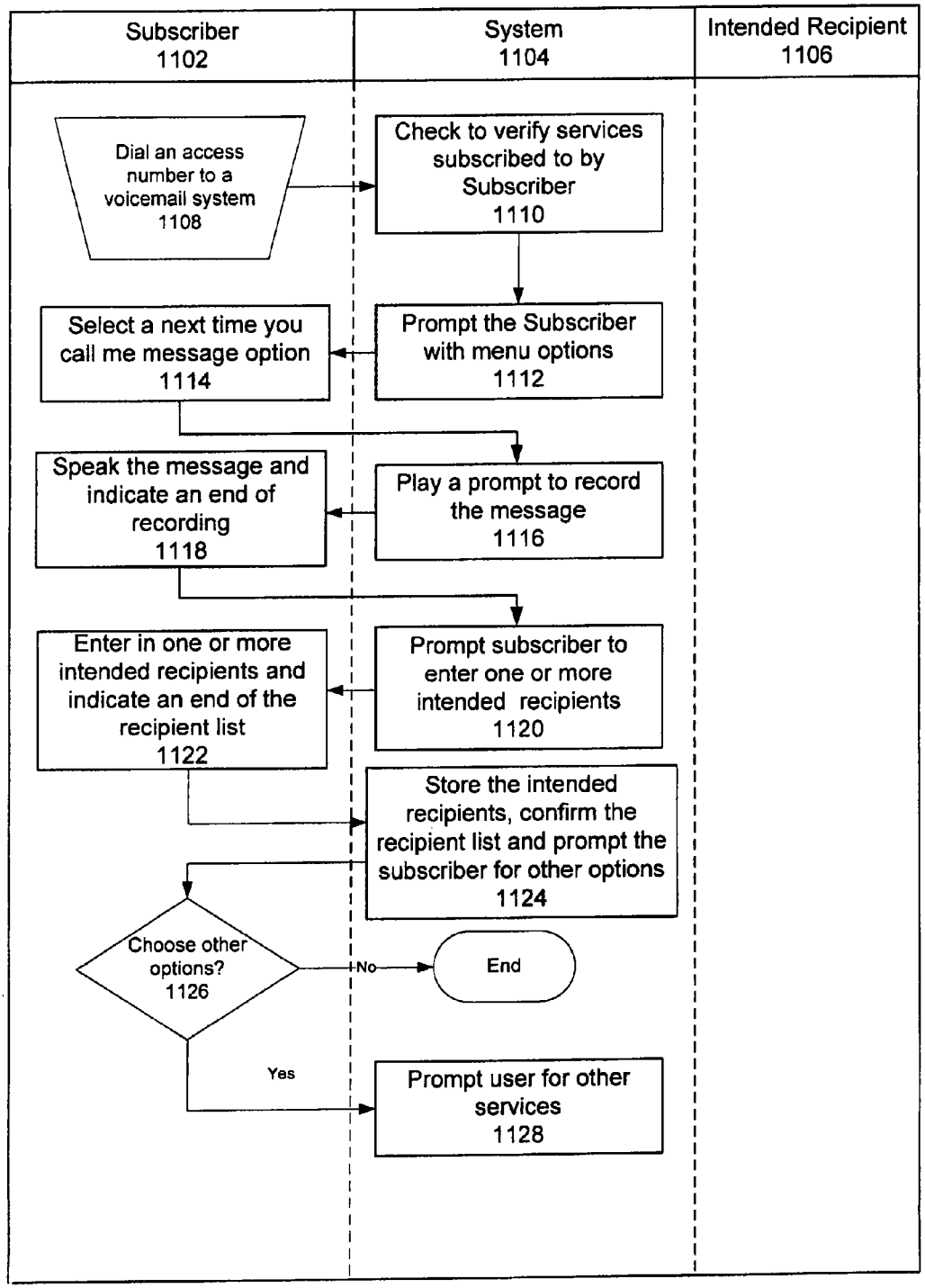
FIG. 11 is a flowchart of a process for recording a pre-call message in accordance with an illustrative embodiment of the present invention.

FIG. 11 is a flowchart of a process for recording a pre-call message in accordance with an illustrative embodiment of the present invention. The process of FIG. 11 may be implemented by a subscriber 1102, a system 1104, and an intended recipient 1106. The subscriber 1102 may be a user using a wireless device, a VoIP telephone or a standard telephone. The system 1104 may be a voicemail system or other pre-call messaging system stored on a server or other advanced intelligent network device. The intended recipient 1106 may be the person or persons to which the pre-call message is directed.

The process of FIG. 11 begins with the subscriber 1102 dialing an access number to a voicemail system (step 1108). Next, the system 1104 checks to verify services subscribed to by the subscriber (step 1110). The services are verified in step 1110 to verify that the subscriber 1102 may leave a pre-call message or "next time you call me" message. The pre-call message may be a message that is left for future receipt by the intended recipient 1106. The system prompts the subscriber with menu options (step 1112).

Next, the subscriber 1102 may select a "next time you call me" message option (step 1114). The system 1104 plays a prompt to record the message (step 1116). The subscriber 1102 may then speak the message and indicate an end of recording (step 1118).

The system 1104 may prompt the subscriber to enter one or more intended recipients (step 1120). The subscriber 1102 may then enter in one or more intended recipients and indicate an end of the recipient list (step 1122). The system 1104 may then store the intended recipient, confirm the recipient list, and prompt the subscriber for other options (step 1124). Next, the subscriber 1102 may determine whether to choose other options (step 1126). If the subscriber 1102 determines not to choose other options the process terminates. If the subscriber 1102 chooses other options in step 1126 the system 1104 prompts the subscriber for other services (step 1128). For example, the other services 1128 may include access to regular voicemail.

Figure 12:
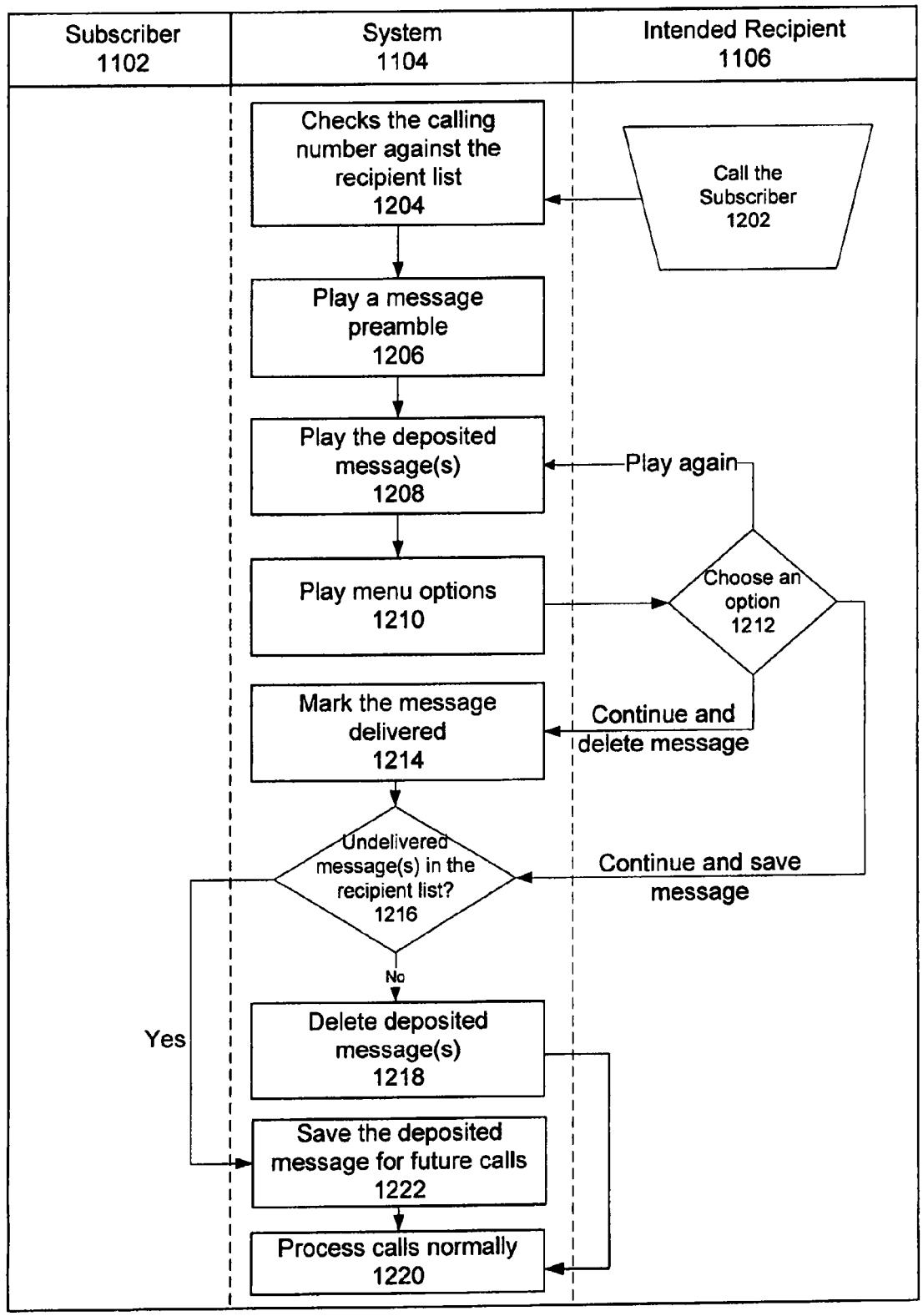
FIG. 12 is a flowchart of a process for playing a recorded pre-call message in accordance with an illustrative embodiment of the present invention.

FIG. 12 is a flowchart of a process for playing a recorded pre-call message in accordance with an illustrative embodiment of the present invention. The process of FIG. 12 may occur once a pre-call message is recorded, stored, and associated with an intended recipient. The process begins with the intended recipient 1106 calling the subscriber (step 1202).

Next, the system 1104 checks the calling number against the recipient list (step 1204). The system 1104 may check an IP address, caller identification, voice identification or other identification or indicator against the recipient list. The system 1104 plays a message preamble (step 1206). The message preamble may be used to indicate that the subscriber 1102 has a pre-recorded message specially designated for the intended recipient 1106. For example, the message preamble may indicate, "the subscriber you called is unavailable, but has left you a special message as follows". The message preamble may play during the ring back period before the wireless device of the subscriber 1102 has rang. In one embodiment, the subscriber 1102 may set the system to not play the message preamble.

Next, the system 1104 plays the deposited message (step 1208). The deposited message may be a personalized message that was previously recorded for the intended recipient 1106. In one example, the deposited message may be recorded by the subscriber 1102 based on circumstances that have changed a prior plan to meet between the subscriber 1102 and the intended recipient 1106. Such a message may state "I had an important tee time come up and I'm going to be unable to meet with you this afternoon, so let's reschedule for tomorrow at 2:00 p.m. Thanks, sorry about that". The message preamble and deposited message may be played to the intended recipient 1106 before the phone rings. The message preamble and deposited message may be played to the user regardless of the status of the phone, such as on, off, unavailable, or in a do-not-disturb mode. For example, even if the user is available, the pre-call message may be played to the intended recipient 1106.

The system 1104 may then play menu options (step 1210). The intended recipient 1106 may choose an option (step 1212). If the intended recipient 1106 selects to play the message again, the system 1104 plays the deposited message (step 1208). If the intended recipient 1106 selects to continue and delete the message, the system 1104 marks the message delivered (step 1214). Next, the system 1104 determines whether there are undelivered messages in the recipient list (step 1216). If the system 1104 determines there are not undelivered messages in the recipient list, the system 1104 deletes the delivered messages (step 1218). Next, the system 1104 processes calls normally (step 1220). If the intended recipient 1106 determines to continue and save the message in step 1212, and the system 1104 determines there are undelivered messages in the recipient list in step 1216, the system 1104 saves the deposited message for future calls (step 1222).

Figure 13:
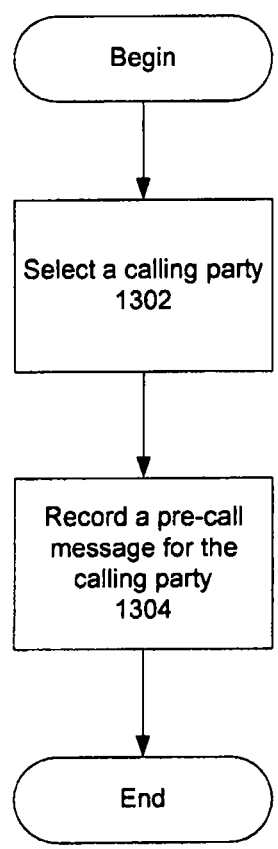
FIG. 13 is a flowchart of a process for recording a pre-call message in accordance with an illustrative embodiment of the present invention.

FIG. 13 is a flowchart of a process for recording a pre-call message in accordance with an illustrative embodiment of the present invention. FIG. 13 is a simplified flowchart for the process of FIG. 11. The process begins by selecting the calling party (step 1302). Next, the device records a pre-call message for the calling party (step 1304). The calling party and the pre-call message are associated so that when the calling party calls, the pre-call message is automatically played without the telephone ringing or without two-way communication occurring. Alternatively, the pre-call message may be recorded before selecting one or more calling parties.

Figure 14:
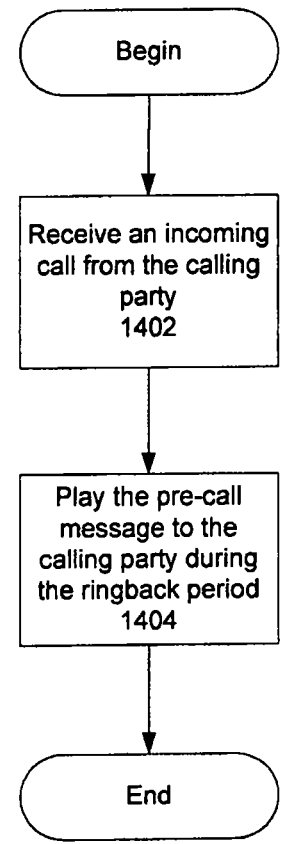
FIG. 14 is a flowchart of a process for playing a pre-call message in accordance with an illustrative embodiment of the present invention.

FIG. 14 is a flowchart of a process for playing a pre-call message in accordance with an illustrative embodiment of the present invention. The process of FIG. 14 is a simplified process of FIG. 12. The process begins by receiving an incoming call from the calling party (step 1402). Incoming calls that are not from a designated calling party may be processed normally or sent to voicemail as specified by the user. Next the device plays the pre-call message to the calling party during the ring back period (step 1404).

The pre-call message may be played to the calling party with the call then ending or being transferred into voicemail. In one embodiment, the calling party may not be presented with options to save or delete the pre-call message. Instead, the pre-call message may be played every time the calling party calls or until a time period expires. The pre-call message may be used in conjunction with an incremental do-not-disturb feature. For example, the message from the system to the calling party may be a combination of one or more message preambles and a recorded message combined as follows: "The user you called is unavailable for thirty more minutes. The user left you the following message . . . Jane, I'll call you back when I get out of this last minute budget meeting".

In another embodiment, once the device has ensured that the calling party has received the entire message, the message may be deleted and not played to the calling party again. Alternatively, the pre-call message may be continuously played to the designated calling party until deleted, removed, or inactivated by the user.

The features of the present invention may be used independently or in combination to provide improved communications options and security for a user from a standard telephone, VoIP telephone, wireless phone, or other communications device or protocol. In one embodiment, the features, customizations, and user preferences may be transferred or implemented between various network devices and telephonic devices. For example, a caller identification voice announce recorded for a home VoIP telephone may be transferred to a wireless device. In another example, the incremental do-not-disturb feature may be activated using on a wireless device, but implemented for a home phone and business phone as well. In yet another example, a user may record a pre-call message for use with a business number from a wireless device by accessing the voicemail system of the business phone.

The previous detailed description is of a small number of embodiments for implementing the invention and is not intended to be limiting in scope. The following claims set forth a number of the embodiments of the invention disclosed with greater particularity.

What is claimed:

1. A method for incremental do-not-disturb, comprising:
receiving user input to activate the incremental do-not-disturb on a telephone; activating the incremental do-not-disturb for a time period in response to receiving the user input to activate the incremental do-not-disturb; wherein the user input is one or more successive taps applied to the telephone,
receiving a plurality of do-not-disturb activation signals, wherein each of the do-not-disturb activation signals represents a time increment added to the time period to generate a new time period; and diverting incoming calls during the time period in response to activating the incremental do-not-disturb.

2. The method according to claim 1, further comprising:
decrementing the time period in response to receiving a secondary user input to decrease the incremental do-not-disturb.

3. The method according to claim 1, further comprising:
creating the time period based on the user input specifying a start time and an end time.

4. The method according to claim 1, wherein the user input specifies days of the week that the time period is to be reocurringly initiated or events that activate the time period.

5. The method according to claim 1, wherein the incremental do-not-disturb is implemented utilizing user preferences, and wherein the user preferences specify phone numbers that are allowed to communicate with the telephone even during activation of the incremental do-not-disturb.

6. The method according to claim 1, wherein the user input is received through a secondary device in communication with the telephone.

7. The method according to claim 1, further comprising:
remaining in an incremental do-not-disturb state while the time period is active; and
playing a message to callers associated with the incoming calls indicating unavailability of a user associated with the telephone and a time remaining in the time period;
processing the incoming calls normally in response to the time period expiring.

8. The method according to claim 1, wherein the user input is tactile input received through an accelerometer of the telephone.

9. The method according to claim 1, further comprising:
adding additional time to the time period in response to receiving additional user input.

10. The method according to claim 7, further comprising:
sending the incoming call to voicemail after playing the message.

11. A server enabling incremental do-not-disturb, comprising: a processor for executing a set of instructions; a memory configured to store the set of instructions, wherein the set of instructions are executed by the processor to:
receive user input to activate the incremental do-not-disturb for a telephone; activate the incremental do-not-disturb for a time period in response to receiving the user input to activate the do-not-disturb; wherein the user input is one or more successive taps applied to the telephone;
receive a plurality of do-not-disturb activation signals, wherein each of the do-not-disturb activation signals represents a time increment added to the time period to generate a new time period; and divert incoming calls to the telephone during the time period in response to activating the increment do-not-disturb.

12. The server according to claim 11, wherein the set of instructions are executed to:
intercept the incoming calls and prevent the incoming calls from being received by the telephone.

13. The server according to claim 11, wherein the set of instructions are executed to:
play a message to parties associated with the incoming calls indicating unavailability of a user associated with the telephone and the time period remaining.

14. The server according to claim 11, wherein the set of instruction are executed to:
receive additional user input to increase or decrease the time period by a time increment.

15. A telephone implementing incremental do-not-disturb, comprising:
a processor for executing a set of instructions;
a memory configured to store the set of instructions, wherein the set of instructions are executed by the processor to:
receives user input to activate the incremental do-not-disturb for the telephone; activates the incremental do-not-disturb for a time period in response to receiving the user input to activate the do-not-disturb; wherein the user input is one or more successive taps applied to the telephone;
receive a plurality of do-not-disturb activation signals, wherein each of the do-not- disturb activation signals represents a time increment added to the time period to generate a new time period and diverts incoming calls to the telephone during the time period in response to activating the increment do-not-disturb.

16. The telephone according to claim 15, wherein the set of instructions are executed to:
play a message to parties associated with the incoming calls indicating unavailability of a user associated with the telephone and the time period remaining; and
send the incoming calls to voicemail in response to playing the message.

17. The telephone according to claim 15, wherein the set of instruction are executed to:
receive additional user input to increase or decrease the time period by a time increment.

18. The telephone according to claim 15, wherein the telephone is any of a Voice over Internet protocol phone, analog phone, digital phone, or wireless phone.

* * * * *